US011919558B2

(12) United States Patent
Whitley

(10) Patent No.: US 11,919,558 B2
(45) Date of Patent: Mar. 5, 2024

(54) SHOPPING TROLLEY

(71) Applicant: Tammy Whitley, Katy, TX (US)

(72) Inventor: Tammy Whitley, Katy, TX (US)

( * ) Notice: Subject to any disclaimer, the term of this patent is extended or adjusted under 35 U.S.C. 154(b) by 534 days.

(21) Appl. No.: 17/065,694

(22) Filed: Oct. 8, 2020

(65) Prior Publication Data

US 2021/0197879 A1    Jul. 1, 2021

Related U.S. Application Data

(60) Provisional application No. 62/912,159, filed on Oct. 8, 2019.

(51) Int. Cl.
*B62B 3/02* (2006.01)
*B62B 3/14* (2006.01)
*B62B 5/00* (2006.01)
*B62B 5/06* (2006.01)

(52) U.S. Cl.
CPC ............ *B62B 3/027* (2013.01); *B62B 5/0003* (2013.01); *B62B 5/0006* (2013.01); *B62B 5/066* (2013.01); *B62B 3/02* (2013.01); *B62B 3/022* (2013.01); *B62B 3/1444* (2013.01); *B62B 3/1464* (2013.01); *B62B 5/0013* (2013.01); *B62B 2202/023* (2013.01); *B62B 2202/65* (2013.01); *B62B 2205/104* (2013.01); *B62B 2206/06* (2013.01)

(58) Field of Classification Search
CPC ..... B62B 3/027; B62B 5/003; B62B 2206/06; B62B 7/062; B62B 3/022; B62B 3/08; B62B 3/1404; B62B 3/1496; B62B 5/0003; B62B 5/0006; B62B 2203/04; B62B 2203/70; B62B 2205/121
See application file for complete search history.

(56) References Cited

U.S. PATENT DOCUMENTS

| | | | | | |
|---|---|---|---|---|---|
| 2,133,834 | A | * | 10/1938 | Sheldon | B62B 3/1464 280/47.35 |
| 3,118,553 | A | * | 1/1964 | Rosenzweig | B62B 5/0003 414/469 |
| 3,195,912 | A | * | 7/1965 | Howard | B62B 5/0006 293/118 |
| 3,442,406 | A | * | 5/1969 | Lowe | B62B 3/027 280/33.996 |
| 3,498,628 | A | * | 3/1970 | Ferneau | B62B 5/0003 280/659 |
| 3,536,283 | A | * | 10/1970 | Lowe | B62B 3/027 280/33.996 |
| 3,913,935 | A | * | 10/1975 | McGillicuddy | B62B 3/027 280/641 |
| 4,765,644 | A | * | 8/1988 | Bell | B62B 3/027 280/651 |

(Continued)

FOREIGN PATENT DOCUMENTS

| | | | | |
|---|---|---|---|---|
| DE | 102008061318 A1 | * | 6/2009 | ............... B60R 5/04 |
| DE | 102008023630 A1 | * | 11/2009 | ............. B62B 3/027 |

(Continued)

*Primary Examiner* — Emma K Frick

(57) ABSTRACT

The shopping cart of the present disclosure may be used to carry and transport goods. The cart includes a basket and a chassis wherein the chassis includes legs rotatable from an open position to a closed position. The basket is rotatably affixed to the chassis such that the cart may be placed in a vehicle trunk while the basket maintains a horizontal position.

4 Claims, 22 Drawing Sheets

(56) References Cited

U.S. PATENT DOCUMENTS

| | | | | |
|---|---|---|---|---|
| 5,046,748 | A * | 9/1991 | Oat-Judge | B62B 5/0438 482/68 |
| 5,553,877 | A * | 9/1996 | Huang | B62B 3/144 446/268 |
| 6,575,491 | B2 * | 6/2003 | Miller | B62B 5/0003 280/638 |
| 7,055,847 | B2 * | 6/2006 | Miller | B62B 3/022 248/161 |
| 8,075,016 | B2 * | 12/2011 | Silberberg | B62B 3/027 280/43 |
| 8,172,256 | B2 * | 5/2012 | Fine | B62B 5/0003 280/638 |
| 8,333,404 | B2 * | 12/2012 | Moster | B62B 3/027 280/38 |
| 8,550,474 | B2 * | 10/2013 | Geva | B62B 3/1444 280/638 |
| 8,979,115 | B1 * | 3/2015 | Baron | B62B 3/106 280/DIG. 4 |
| 9,211,899 | B2 * | 12/2015 | Beauchamp | B62B 3/027 |
| 9,221,486 | B2 * | 12/2015 | Fine | B62B 5/0003 |
| 9,573,610 | B1 * | 2/2017 | Chaturvedi | B62B 3/005 |
| 9,573,611 | B2 * | 2/2017 | Coyle | B62B 3/027 |
| D810,380 | S * | 2/2018 | Sommerfield | D34/21 |
| 10,081,381 | B2 * | 9/2018 | Lin | B62B 3/022 |
| 10,106,182 | B2 * | 10/2018 | Camarco | B62B 5/0003 |
| 10,512,584 | B2 * | 12/2019 | Goodsell | A61H 3/04 |
| 10,640,135 | B1 * | 5/2020 | Geffen | B62B 3/02 |
| 11,046,343 | B2 * | 6/2021 | Stroh | B62B 5/0013 |
| 11,447,167 | B2 * | 9/2022 | O'Donnell | B62B 5/0003 |
| 11,685,415 | B2 * | 6/2023 | Hofmann | B62B 5/085 280/651 |
| 2005/0140119 | A1 * | 6/2005 | Wong | B62B 3/027 280/651 |
| 2011/0156375 | A1 * | 6/2011 | Gal | B62B 3/027 280/651 |
| 2014/0232088 | A1 * | 8/2014 | Ektron | B62B 7/062 280/648 |
| 2016/0347341 | A1 * | 12/2016 | Tauber | B62B 3/027 |
| 2017/0225699 | A1 * | 8/2017 | Santelli | B62B 3/027 |
| 2020/0223465 | A1 * | 7/2020 | Geffen | B62B 3/027 |
| 2020/0385040 | A1 * | 12/2020 | Rogers | B62B 3/02 |
| 2022/0258784 | A1 * | 8/2022 | Petrovich | B62B 3/1464 |
| 2023/0126601 | A1 * | 4/2023 | Smock | B62B 3/04 320/109 |

FOREIGN PATENT DOCUMENTS

| | | | | |
|---|---|---|---|---|
| ES | | 2366851 B1 * | 9/2012 | B62B 1/125 |
| ES | | 1138834 U * | 5/2015 | |

* cited by examiner

SHOPPING TROLLEY

PRIOR RELATED APPLICATIONS

This application claims priority to U.S. Ser. No. 62/912,159, filed on Oct. 8, 2019, and incorporated by reference in its entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Shopping carts are often provided at stores and supermarkets for use by the customer to conveniently carry goods (e.g. groceries) the customer desires to purchase. Once the goods have been purchased, the customer must transport the goods to their final destination (e.g. their house) without the use of the shopping carts that are owned by the store and must remain on the store premises (i.e. either inside the store or in the store parking lot). Typically, the customer places the goods in one or more bags that can either be placed in the customer's vehicle for transport or hand carried if the customer is using alternative transportation methods (e.g. walking or bus). This typical methodology requires multiple modes of transport for the purchased goods and may result in difficulty in carrying heavier goods or large numbers of goods.

BRIEF DESCRIPTION OF THE DRAWINGS

For a detailed description of embodiments of the present disclosure, reference will now be made to the accompanying drawings in which.

DETAILED DESCRIPTION

Figure 1A:
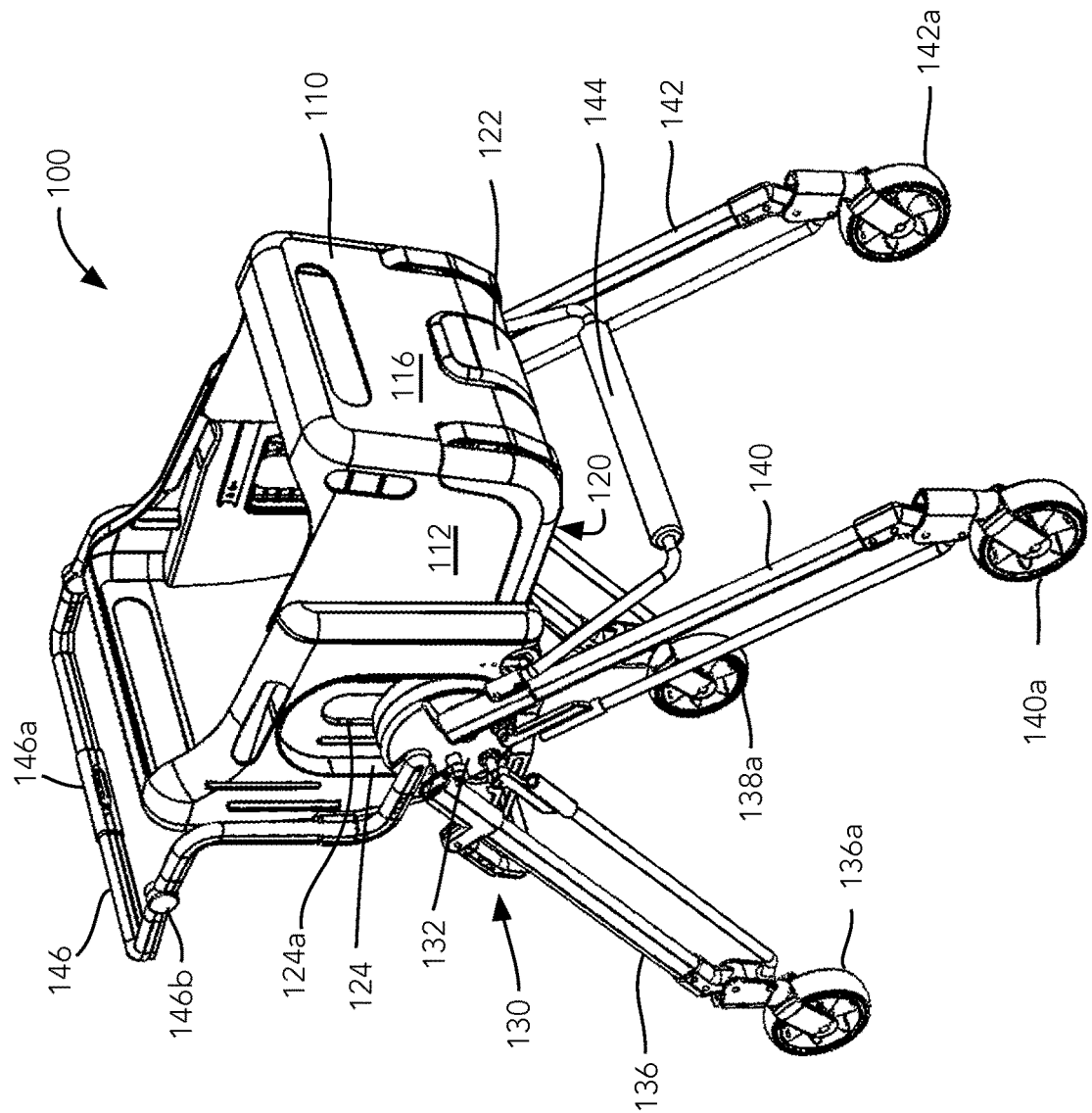
FIG. 1A depicts a front perspective view of a shopping cart in an open position in accordance with one or more embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure and claims, the articles "a," "an," "the," and "said" are intended to mean that there are one or more of the elements. The terms "comprising," "including," and "having" are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

The shopping cart of the present disclosure provides a collapsible shopping cart that may be inserted into a car trunk without having to remove any goods or items that are contained within the basket of the shopping cart. Once the destination is reached, the shopping cart can be removed from the trunk and expanded to its open position while maintaining the goods or items contained within its basket.

Although the shopping cart of the present disclosure is predominantly described with reference to a shopping cart for groceries or other store goods, some embodiments (or some features thereof) may be used in conjunction with or used as various other types of carts and devices. For example, in some embodiments, the shopping cart of the present disclosure may be used as a baby seat, a baby stroller, a toddler seat, a light equipment transport, a clothes carrier, a food transport, or the like.

In some embodiments, and as more fully described herein, the shopping cart of the present disclosure may comprise additional components such as cup holders, purse holders, umbrella holders, battery packs, or the like. It is to be fully recognized that the components taught in the various embodiments may be employed separately or in any suitable combination to produce desired results.

Figure 1B:
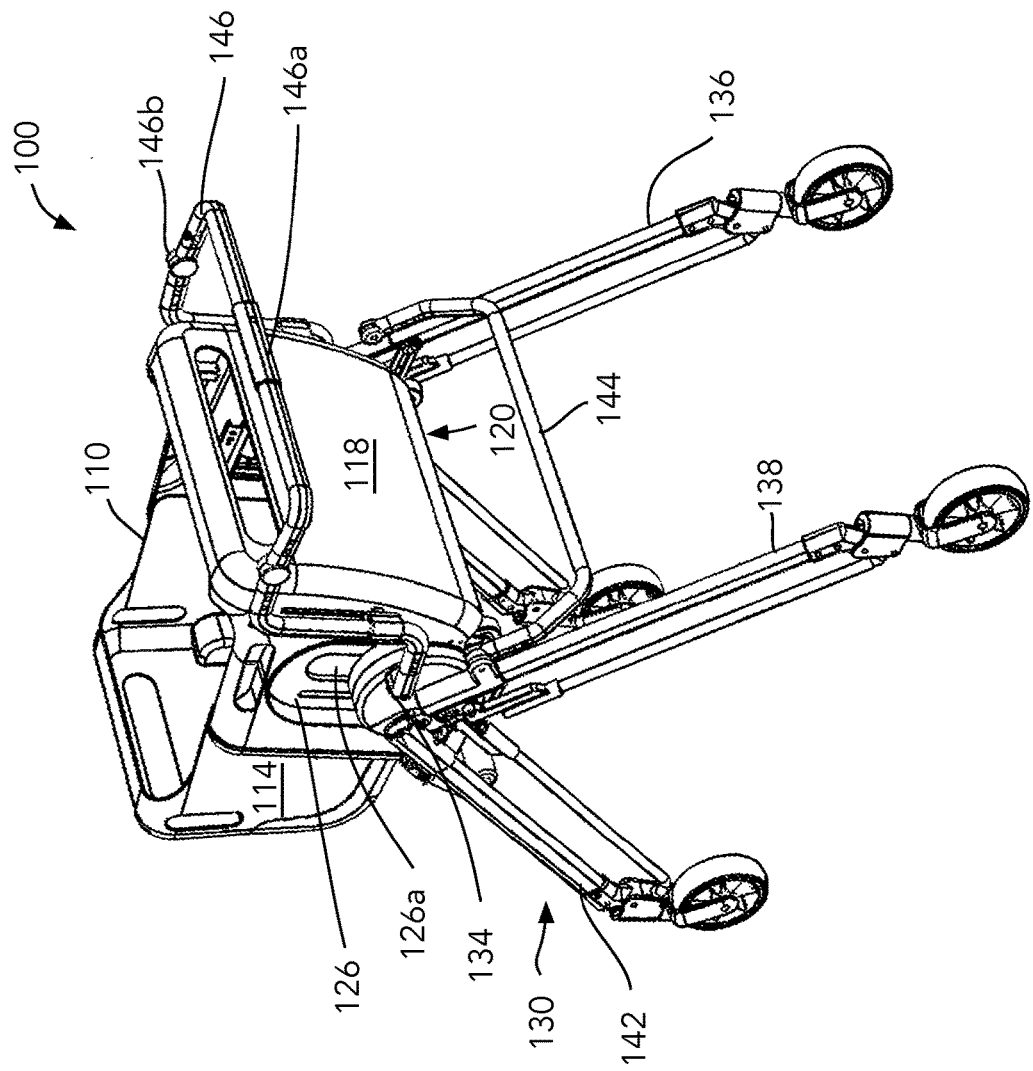
FIG. 1B depicts a rear perspective view of a shopping cart in an open position in accordance with one or more embodiments of the present disclosure.

Referring to FIG. 1A and FIG. 1B, an embodiment of the shopping cart 100 of the present disclosure is shown in an open position. FIG. 1A shows a front perspective view of the shopping cart 100 in an open position while FIG. 1B shows a rear perspective of the shopping cart 100 in an open position.

In some embodiments, the shopping cart 100 includes a basket 110, which may be affixed to a cart chassis 130. In some embodiments, the basket 110 is generally rectangularly shaped with two (2) side walls 112, 114, a front wall 116, a rear wall 118, and a lower surface 120. The side walls 112, 114, the front and rear walls 116, 118, and the lower surface 120 are interconnected such that the basket 110 acts as a container for holding goods and items. It should be noted that in other embodiments, the basket 110 may have other suitable shapes (e.g. oval, elliptical, square, circular, or the like) and remain within the purview of the present disclosure. In some embodiments the basket 110 may be constructed of plastic or elastomeric materials to minimize the risk of impact damage if the basket 110 strikes surrounding objects. In some embodiments, the basket 110 may be constructed of metallic materials with impact bumpers affixed thereon if needed.

In some embodiments, the basket 110 of the shopping cart may include a basket bumper 122 constructed from a suitable material (e.g. elastomeric material such as rubber) to protect the basket 110 and any items that the basket 110 contacts, intentionally or unintentionally. The basket bumper 122 is shown as a rectangular strip but in other embodiments, the basket bump 122 may have other suitable shapes and remain within the purview of the present disclosure. Further, in some embodiments the basket bumper 122 may extend across the full width of the front wall 116 of the basket bumper 122. Additionally, in some embodiments the entire front wall 116 of the basket 110, or part thereof, may be constructed of, or coated with, a suitable material (e.g. elastomeric material such as rubber) such that the front wall 116 acts as the basket bumper 122 of the basket 110.

As shown in FIGS. 1A and 1B, in some embodiments of the present disclosure, the side walls 112, 114 of the basket 110 may include chassis connectors 124, 126. In the embodiment shown, the chassis connectors 124, 126 are integral with the side walls 112, 114 but it should be understood that in some embodiments the chassis connectors 112, 114 may be separate components affixed to the side walls 112, 114. In the embodiment shown, the chassis connectors 124, 126 include channels 124a, 126a that may be used for height adjustment of the basket 110 as will be further described below. In some embodiments wherein the height of the basket 110 is fixed, the chassis connectors 124, 126 may not include channels 124a, 126a.

In some embodiments, the chassis 130 that the basket 110 of the shopping cart 100 is affixed to includes chassis hubs 132, 134. The chassis hubs 132, 134 engage the chassis connectors 124, 126 to affix the basket 110 of the shopping cart 100 to the chassis 130. In some embodiments, the basket 110 is removably affixed to the chassis 130, however, it should be understood that the basket 110 may be permanently affixed to the chassis 130 and remain within the purview of the present disclosure.

Figure 2A:
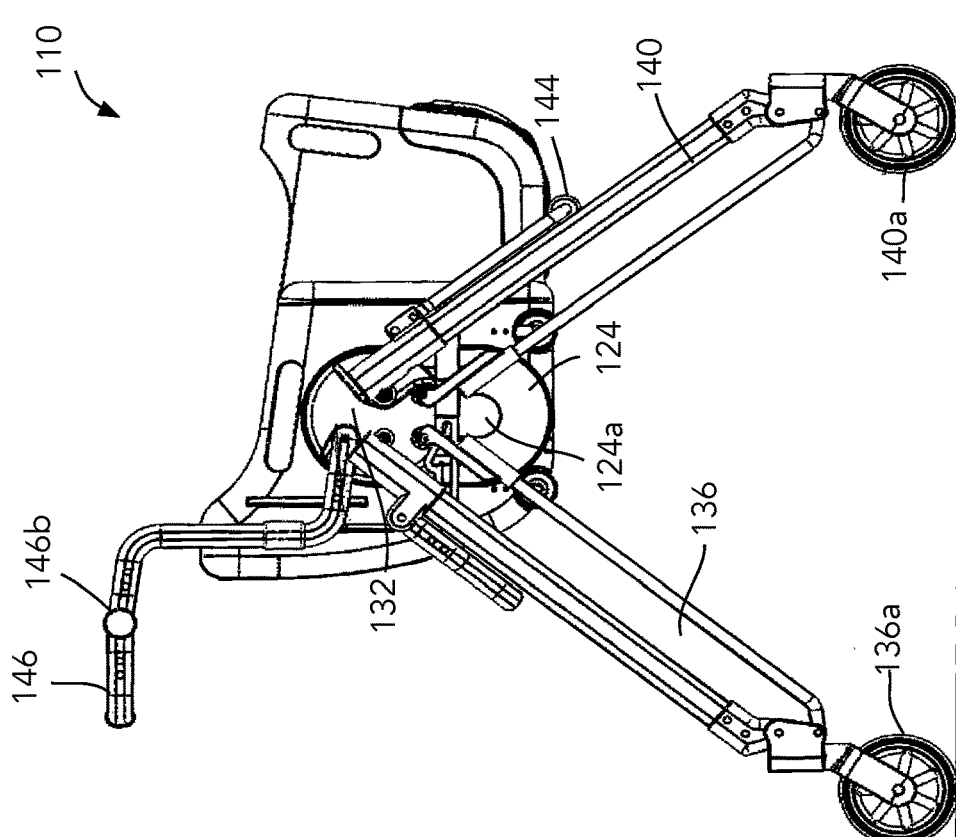
FIG. 2A provides a side view of an embodiment of the shopping cart of the present disclosure in its uppermost position.
Figure 2B:
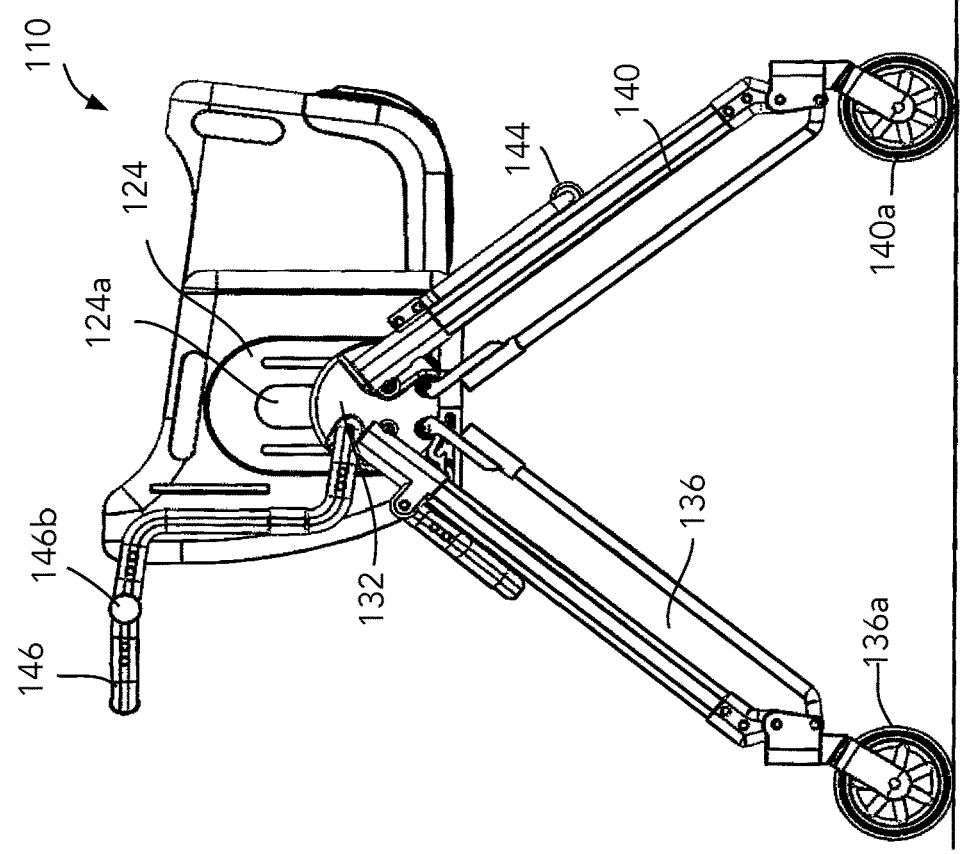
FIG. 2B provides a side view of an embodiment of the shopping cart of the present disclosure in its lowermost position.

In some embodiments, the chassis hubs 132, 134 are affixed to the chassis connectors 124, 126 such that the chassis hubs 132, 134 may rotate with respect to the basket 110 of the shopping cart 100. Further, in the embodiment shown, the chassis hubs 132, 134 may be affixed at any location within the channels 124a, 126a such that the height of the basket 110 may be adjusted. FIGS. 2A and 2B show an embodiment of the present disclosure in which the height of the basket 110 may be adjusted. FIG. 2A shows the chassis hub 132 affixed to the chassis connector 124 in the lowermost portion of the channel 124a, such that the basket 110 is in its uppermost position. FIG. 2B shows the chassis hub 132 affixed to the chassis connector 126 in the uppermost portion of the channel 126a, such that the basket 110 is in its lowermost position. It should be understood that in some embodiments of the present disclosure, the chassis hub 132 may be affixed to the chassis connector 124 at any intermediate position within the channel 124a.

With reference to FIGS. 1-2, each chassis hub 132, 134 may include rear legs 136, 138 and front legs 140, 142. Wheels 136a, 138a, 140a, 142a, are affixed to the lower extremity of each of the legs 136, 138, 140, 142. In some embodiments, the rear legs 136, 138 and the front legs 140, 142 are affixed to the hubs 132, 134 such that the legs 136, 138, 140, 142 may rotate or fold from an open position to a closed position as will be described more fully herein.

In some embodiments, a front frame bumper 144 is rotatably affixed to the chassis hubs 132, 134. The front frame bumper 144 may be constructed of suitable material (e.g. plastic or elastic materials) to minimize the risk of impact damage if the shopping cart 100 strikes surrounding objects. In some embodiments, the front frame bumper 144 may be constructed of hard or metallic material but covered with a suitable material (e.g. elastomeric) to minimize the risk of impact damage. In some embodiments, the front frame bumper 144 is affixed such that it may be rotated to an appropriate position in order to provide the maximum protection for the objects surrounding the shopping cart 100.

In some embodiments of the present disclosure, the shopping cart 100 additionally includes a handlebar 146 affixed to the chassis hubs 132, 134. The handlebar 146 is used to maneuver the shopping cart 100 and is additionally used to manipulate the shopping cart 100 from an open position to a closed position as more fully described herein. The handlebar 146 is affixed to the hub such that it can rotate from its resting position (as shown in FIGS. 1-2) to its upright position as will be more fully described with reference to FIGS. 3A-3E. In its resting position, the legs 136, 138, 140, 142 are locked in an open position in which the shopping cart 100 can be easily maneuvered forward, backward, and sideways.

In some embodiments, the handlebar 146 may include a locking mechanism 146a such as a push button release as is well known in the art of baby strollers that prevents the handlebar 146 from rotating. Additionally, in some embodiments the handlebar 146 may include an adjustment hinge 146b that enables the angle of the handlebar 146 to be adjusted to accommodate different user preferences.

In some embodiments, the chassis 130 additionally includes a lifting handle 148 that is rotatably affixed to the chassis hubs 132, 134. The lifting handle 148 is useful to lift the shopping cart 100 as will be more fully described herein.

Figure 3B:
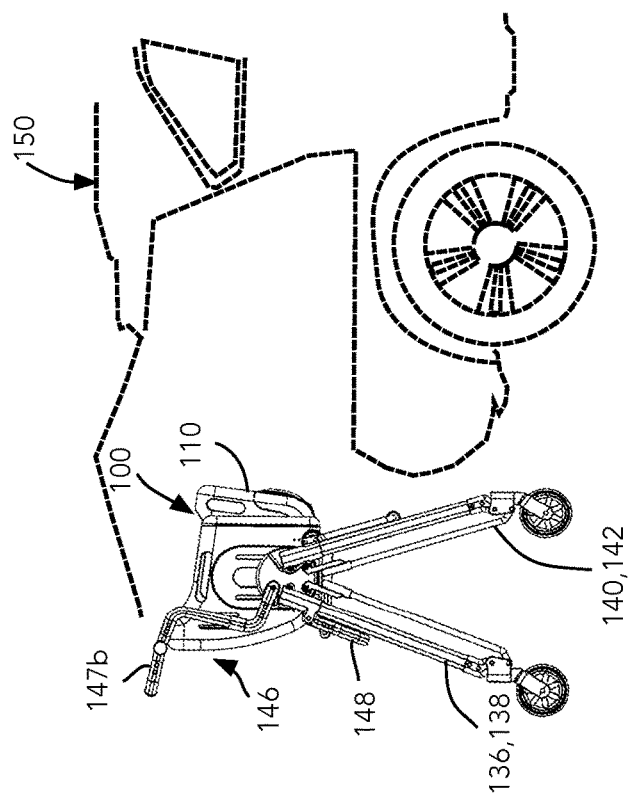
FIGS. 3A-3E illustrate an embodiment of a method of placing an embodiment of the shopping cart of the present disclosure in the trunk of a car.
Figure 3A:
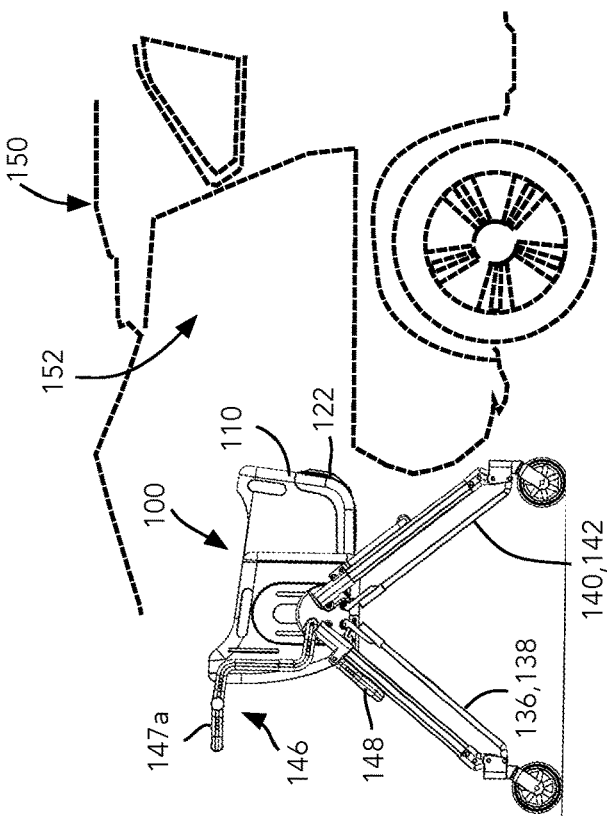

FIGS. 3A-3E illustrate a method of placing an embodiment of the shopping cart 100 of the present disclosure in the trunk of a car. As shown in FIG. 3A, the shopping cart 100 is positioned such that the basket 110 is proximate the trunk compartment 152 of the vehicle 150. The basket bumper 122 assists in locating the basket 110 proximate the trunk compartment 152 by enabling impact with the rear bumper of the vehicle 150 without the risk of damaging the vehicle 150. As previously described, in some embodiments the elevation of the basket 110 and basket bumper 152 may be adjusted to accommodate a full range of vehicle heights.

As described with reference to FIG. 3B, once the basket 110 is proximate the trunk compartment 152, the handlebar 146 is raised from its resting position 147a to its raised position 147b such that the legs 136, 138, 140, 142 are released from their locked, open position (shown in FIG. 3A) and are able to rotate to their closed position (shown in FIG. 3B). This results in the elevation of the basket 110 raising such that the basket 110 and shopping cart 100 can be pushed into the trunk compartment 152.

Figure 3E:
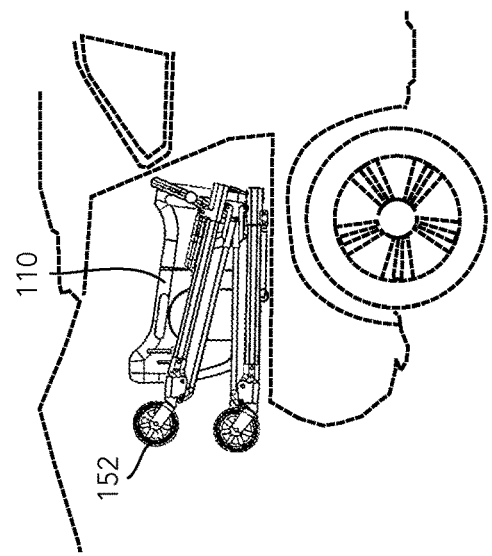
Figure 3D:
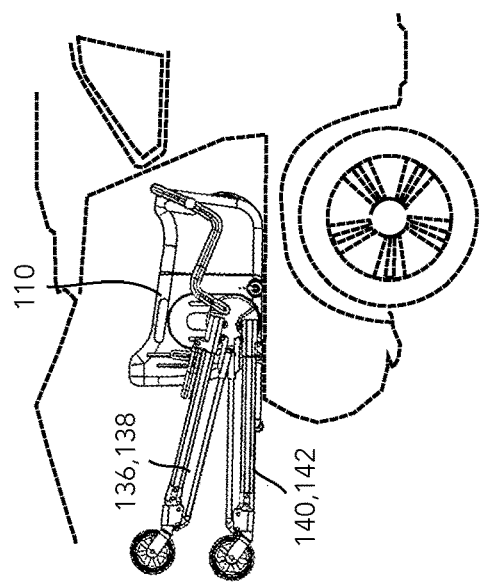
Figure 3C:
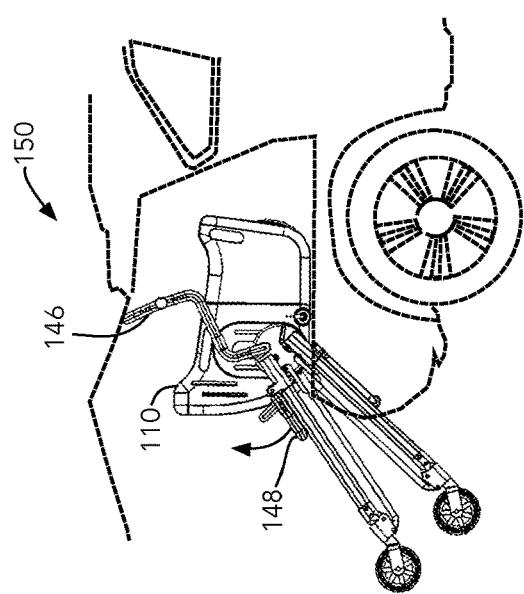

As shown in FIG. 3C, once the basket 110 is positioned partially within the trunk compartment 152, in some embodiments of the present disclosure, the lifting handle 148 is lifted in an upward direction as the basket 110 is further pushed into the trunk compartment 152, resulting in further upward rotation of the legs 136, 138, 140, 142 until the legs 136, 138, 140, 142 are resting within the trunk compartment 152 as shown in FIG. 3D. In some embodiments, as illustrated in FIG. 3E, the legs 136, 138, 140, 142 are slidable with respect to the chassis hubs 132, 134 and can be slid further into the trunk compartment 152 as necessary for the shopping cart 100 to fit fully within the trunk compartment 152.

As illustrated and described with reference to FIGS. 3A-3E, throughout an embodiment of the method of placing the shopping cart 100 in the trunk compartment 152, the basket 110 remains in a horizontal plane with respect to the ground such that groceries or other items stored within, do not need to be removed prior to placing the shopping cart 100 in the trunk compartment. Additionally, as will be described below with reference to FIGS. 4A-4C, the methodology of an embodiment of the present disclosure of removing the shopping cart 100 from the trunk compartment 152 similarly maintains the basket 110 in a horizontal plane with respect to the ground such that the groceries or other items that have been stored and transported therein do not need to be removed to place the shopping cart 100 back into its open position.

Figure 4C:
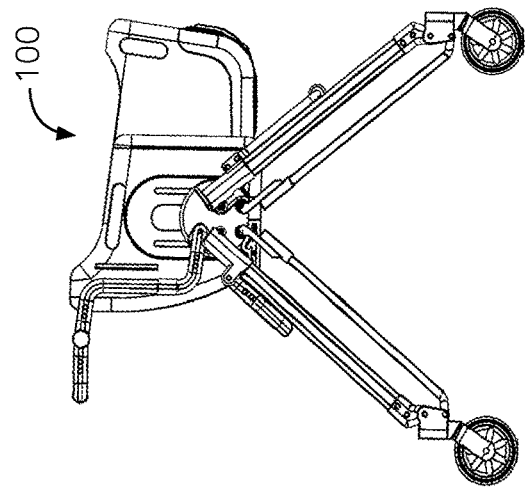
FIGS. 4A-4C illustrate an embodiment of a method of returning the shopping cart of the present disclosure to its open position.
Figure 4B:
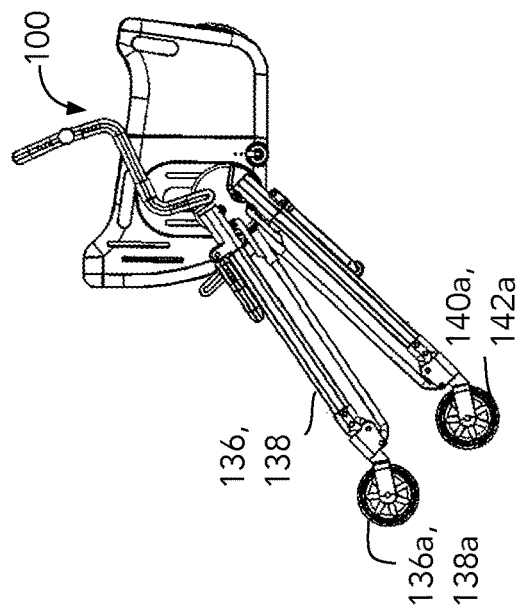
Figure 4A:
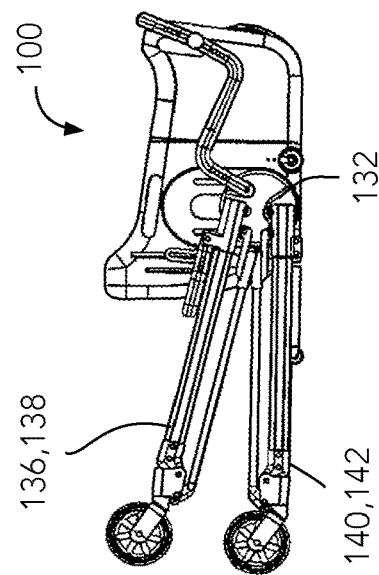

An embodiment of a method of returning the shopping cart 100 to its open position is illustrated in FIGS. 4A-4C. In embodiments in which the legs 136, 138, 140, 142 are slid with respect to the chassis hubs 132, 134, the legs 136, 138, 140, 142 are slid back to their fully retracted position, as illustrated in FIG. 4A. The lifting handle 148 is pulled to partially remove the basket 110 from the trunk compartment 152 (not shown) until the wheels 136a, 138a, 140a, 142a engage the ground. Further backward pulling on the lifting handle 148 along with upward rotation of the handlebar 146 returns the shopping cart 100 to its open position as shown in FIG. 4C.

Figure 5B:
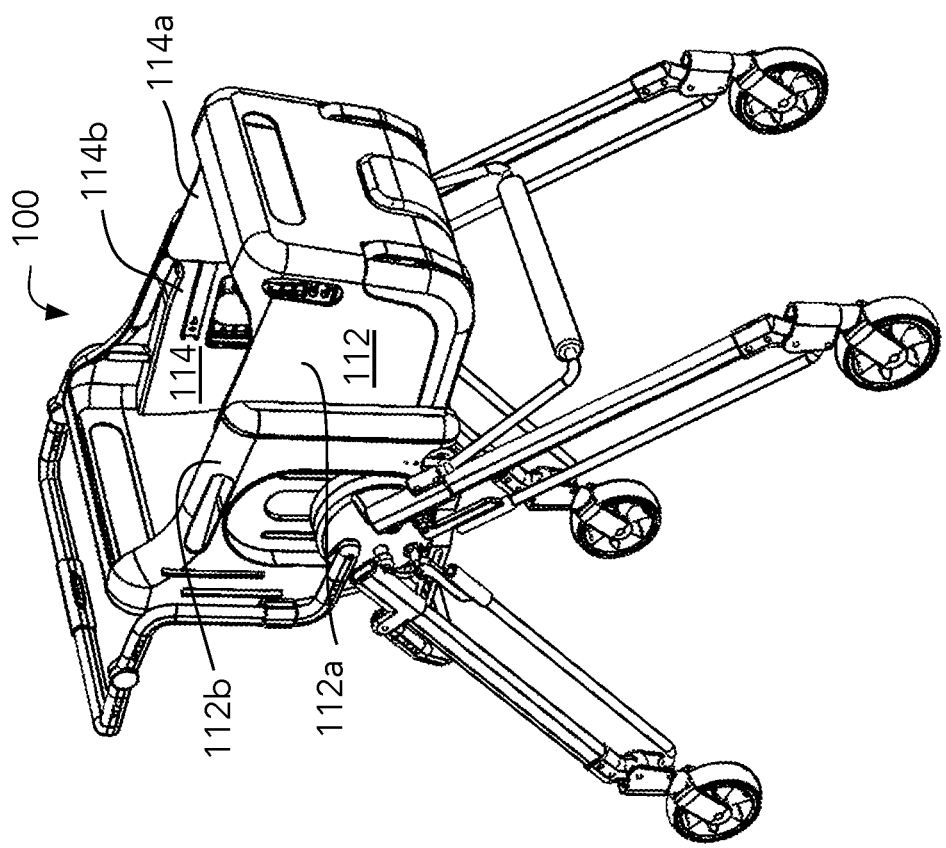
FIG. 5B shows a perspective view of an embodiment of the present disclosure in which the sides of the basket of the shopping cart are adjustable.
Figure 5A:
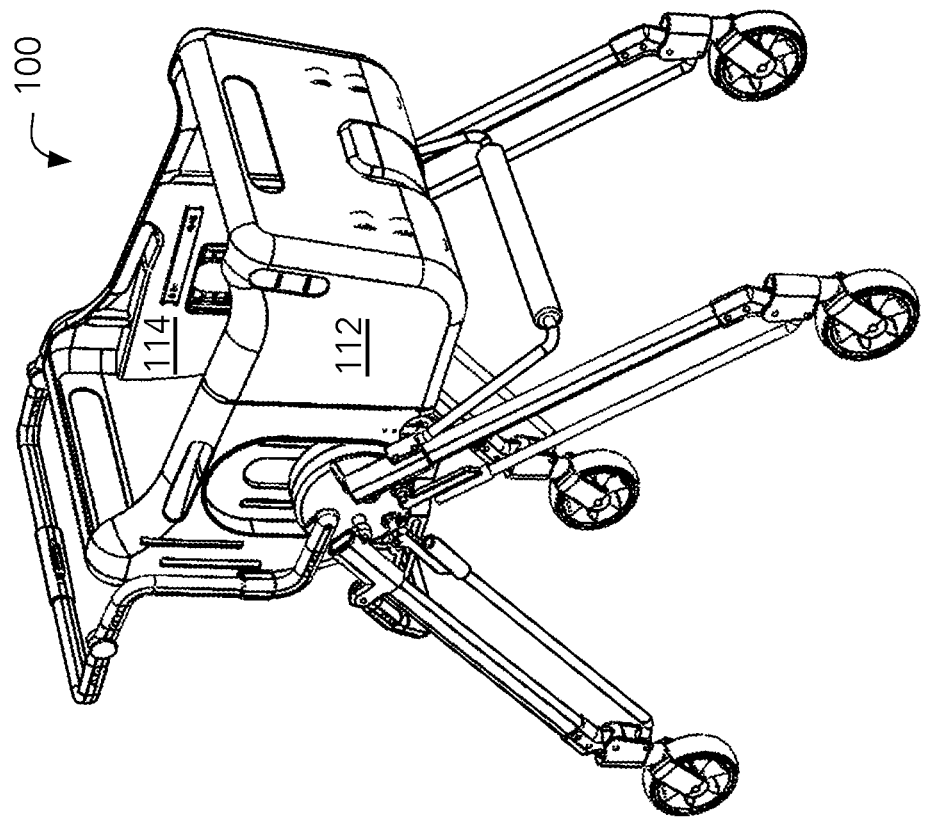
FIG. 5A shows a perspective view of an embodiment of the present disclosure in which the sides of the basket of the shopping cart are fixed.

FIGS. 5A and 5B illustrate embodiments of the shopping cart 100 in which the basket 110 has a fixed dimension (FIG. 5A) and an adjustable dimension (FIG. 5B). The basket 110 illustrated in FIG. 5B may include side walls 112, 114 having telescoping components 112a, 112b and 114a, 114b that are slideably engaged. The telescoping side walls 112, 114 are further described below.

Figure 6C:
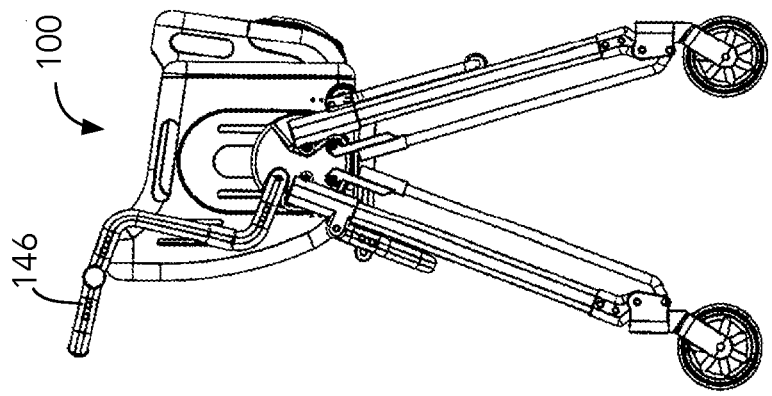
FIGS. 6A, 6B and 6C illustrate an embodiment of a method of adjusting the telescoping basket of the present disclosure.
Figure 6B:
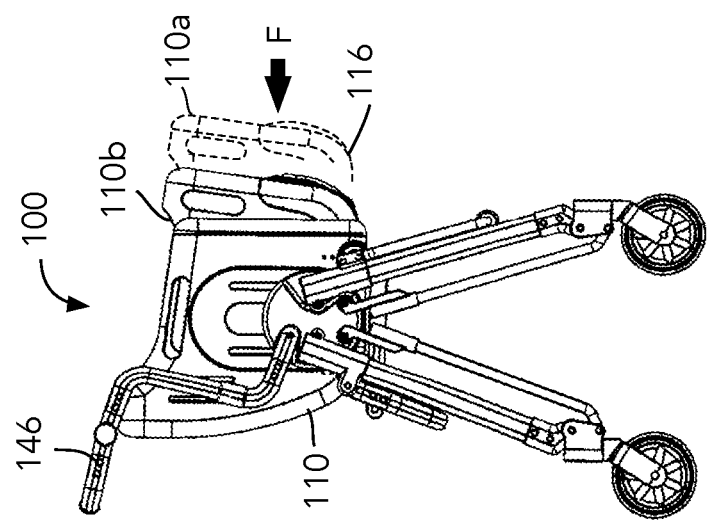
Figure 6A:
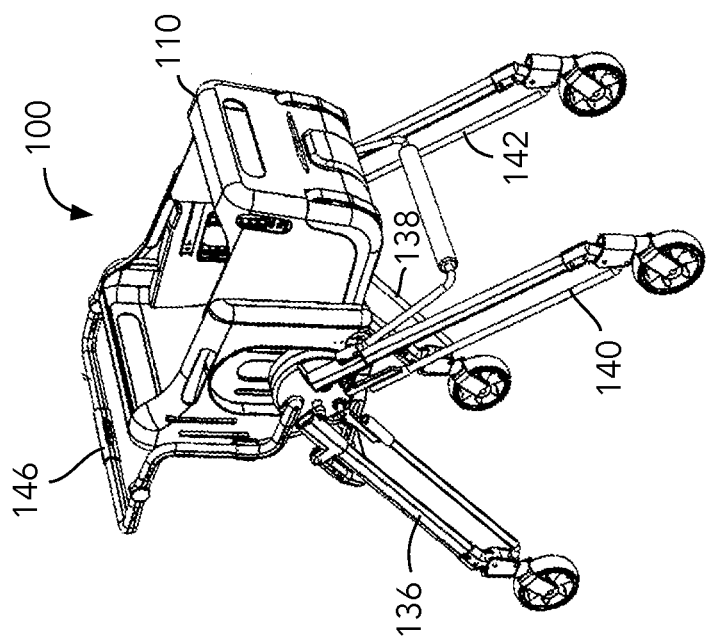

FIGS. 6A-6C illustrate an embodiment of a method of adjusting the telescoping basket 110 of the shopping cart 100 along with adjusting the elevation of the basket 110. FIG. 6A illustrates the shopping cart 100 in its open position with the basket 110 fully extended. In FIG. 6B, a force F is applied to the front wall 116 of the basket 110 such that the telescoping component moves from its fully extended position 110a to its retracted position 110b. In some embodiments, to raise the elevation of the basket 110, upward lifting of the handlebar 146 results in the legs 136, 138, 140, 142 rotating away from their fully open positions such that the overall height of the shopping cart 100 is raised and the wheelbase between the rear legs 136, 138 and the front legs 140, 142 is shortened, as shown in FIG. 6C. In this position, the shopping cart 100 has improved maneuverability and a smaller overall footprint.

Figure 7:
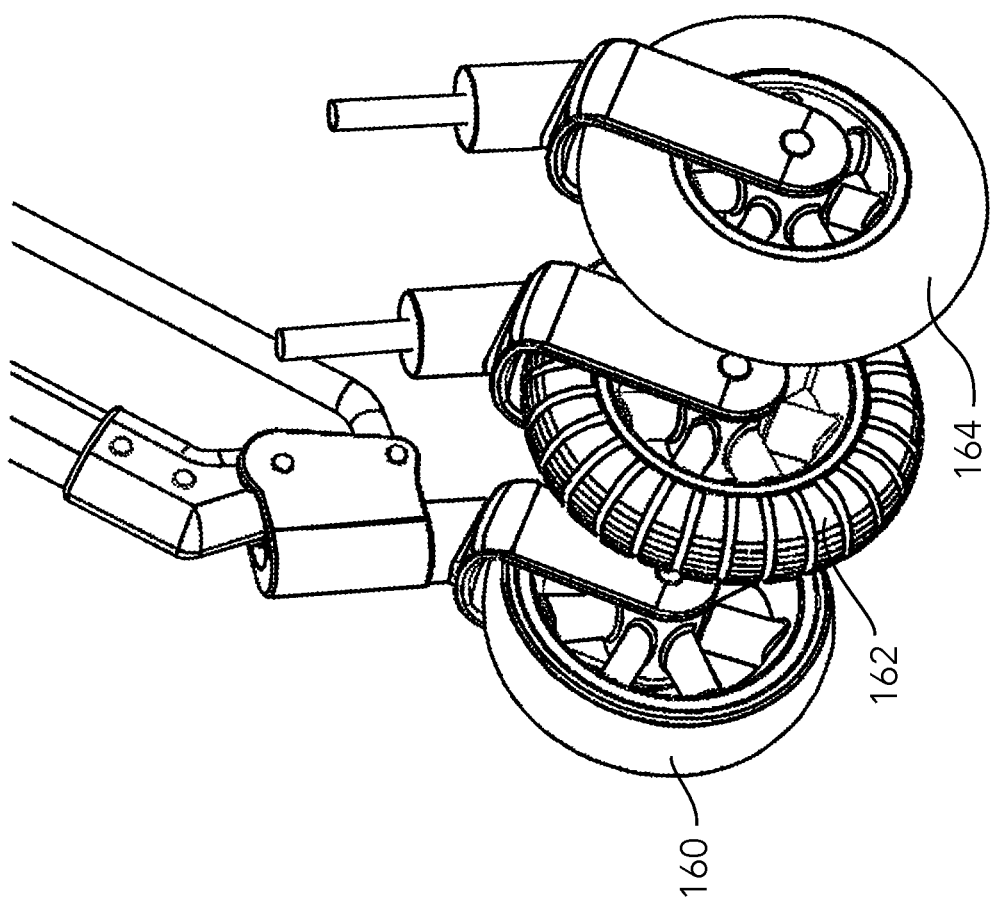
FIG. 7 provides an illustration of some embodiments of the wheels of the shopping cart of the present disclosure.

As illustrated in FIG. 7, in some embodiments of the shopping cart 100 of the present disclosure, the wheels 136a, 138a, 140a, 142a may be of any suitable size or type and may be constructed of any suitable materials. For example, and not by way of limitation, the wheels 136a, 138a, 140a, 142a may be polyurethane wheel 160, off-road wheels 162 or balloon wheels 164 and still remain within the purview of the present disclosure.

Figure 8B:
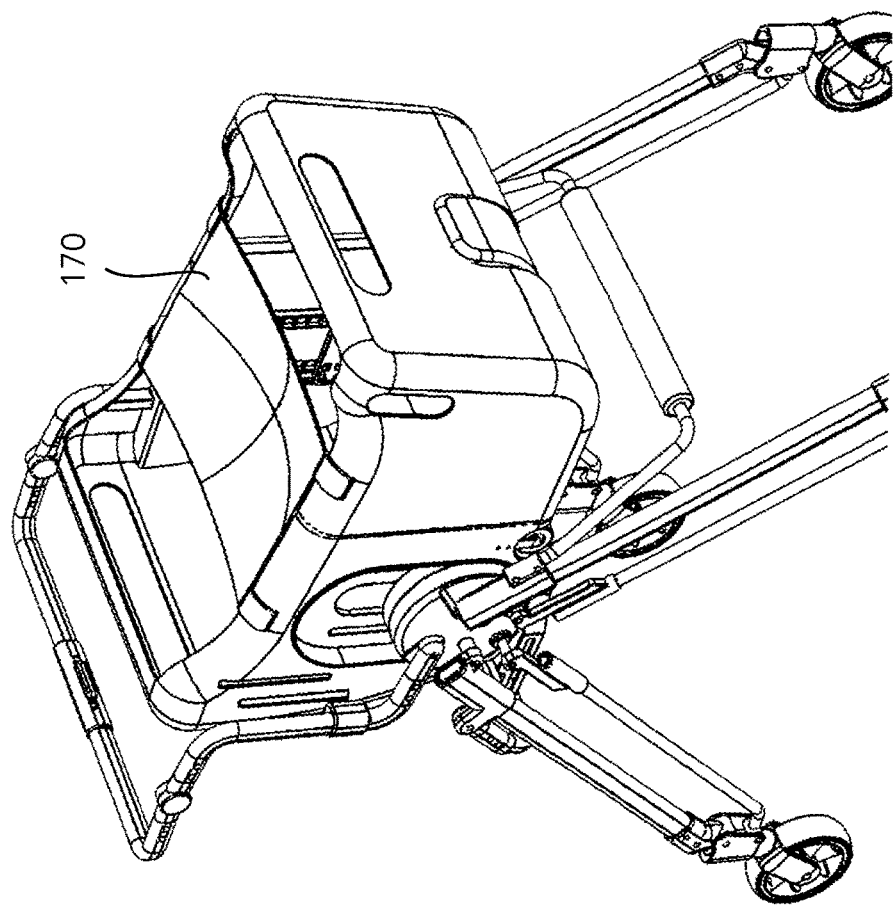
FIGS. 8A and 8B illustrate an embodiment of the present disclosure wherein the shopping cart includes a baby seat holder.
Figure 8A:
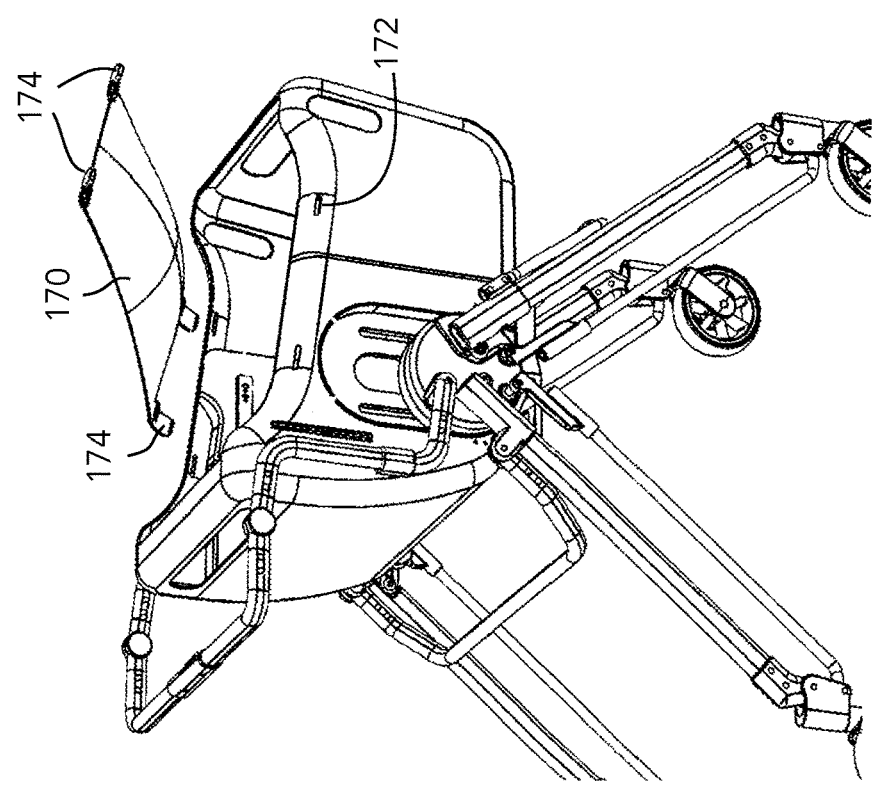

In some embodiments of the present disclosure, the shopping cart 100 may include a baby seat holder 170 as illustrated in FIGS. 8A and 8B. In the embodiment shown, the baby seat holder 170 is comprised of a fabric hammock or other suitable material that includes connecting elements 174 such as tabs that are inserted into attachment holes 172. It should be understood that alternate connection mechanisms and alternate material constructions fall within the purview of the present disclosure.

Figure 9B:
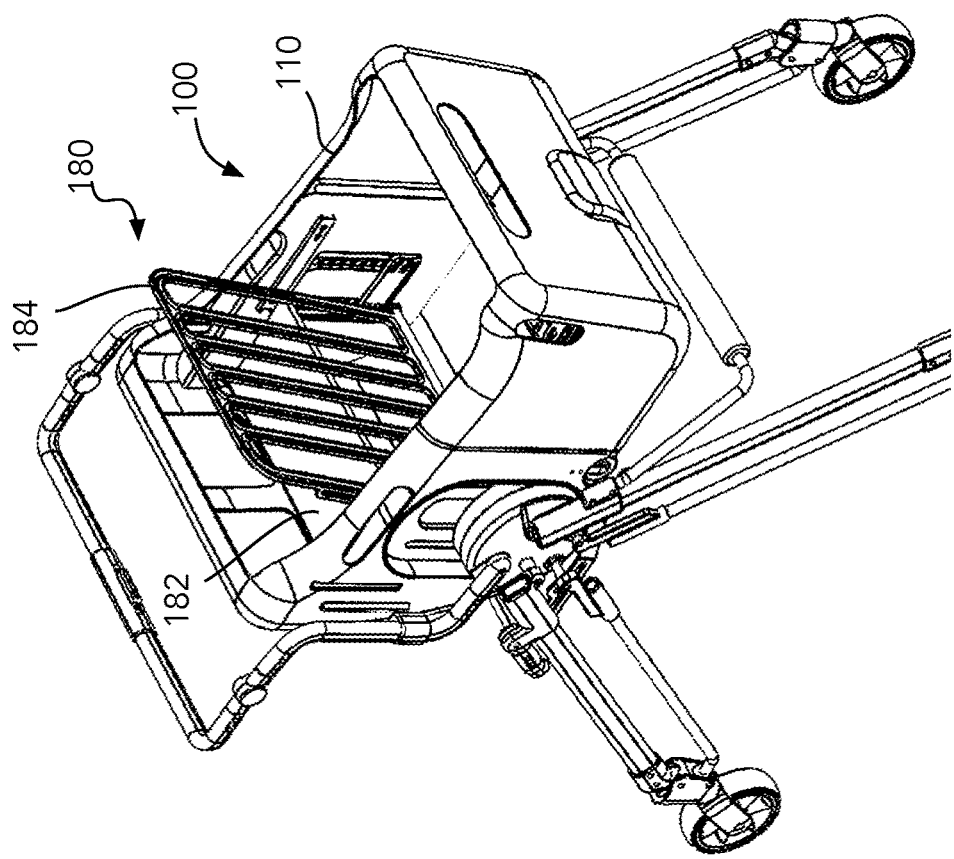
FIGS. 9A and 9B illustrate an embodiment of the present disclosure in which the shopping cart includes a toddler seat.
Figure 9A:
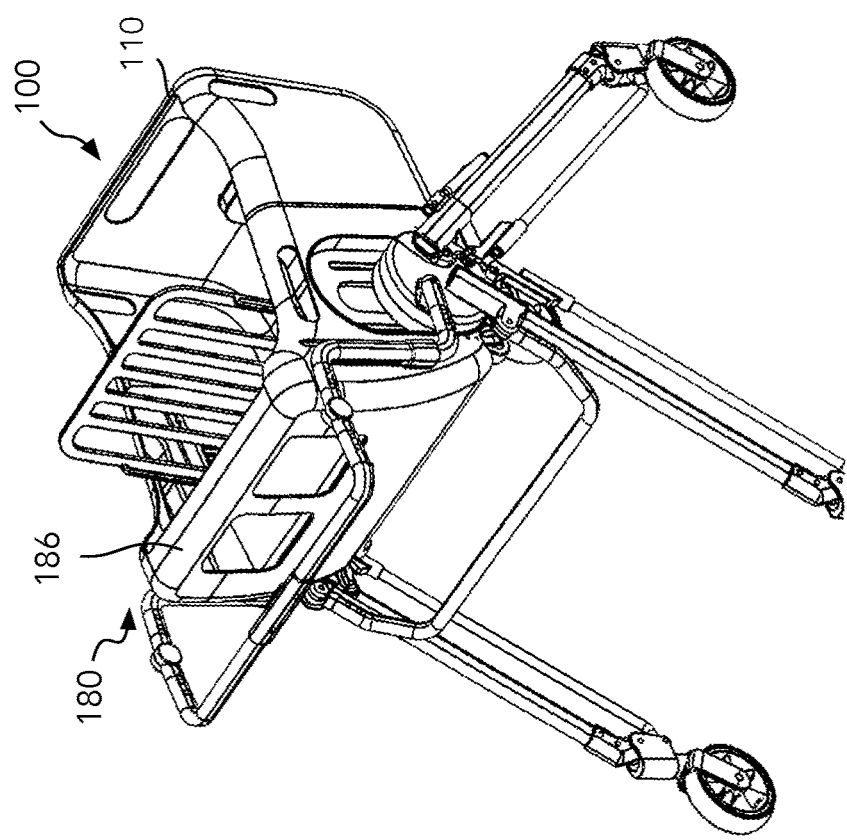

FIGS. 9A and 9B illustrate an embodiment of the present disclosure wherein the shopping cart 100 may include a toddler seat 180. The toddler seat 180 may include a seat 182, a backrest 184, and holes 186 cut into the rear wall 118 of the basket 110 that are suitable for receiving the legs of a toddler.

Figure 10A:
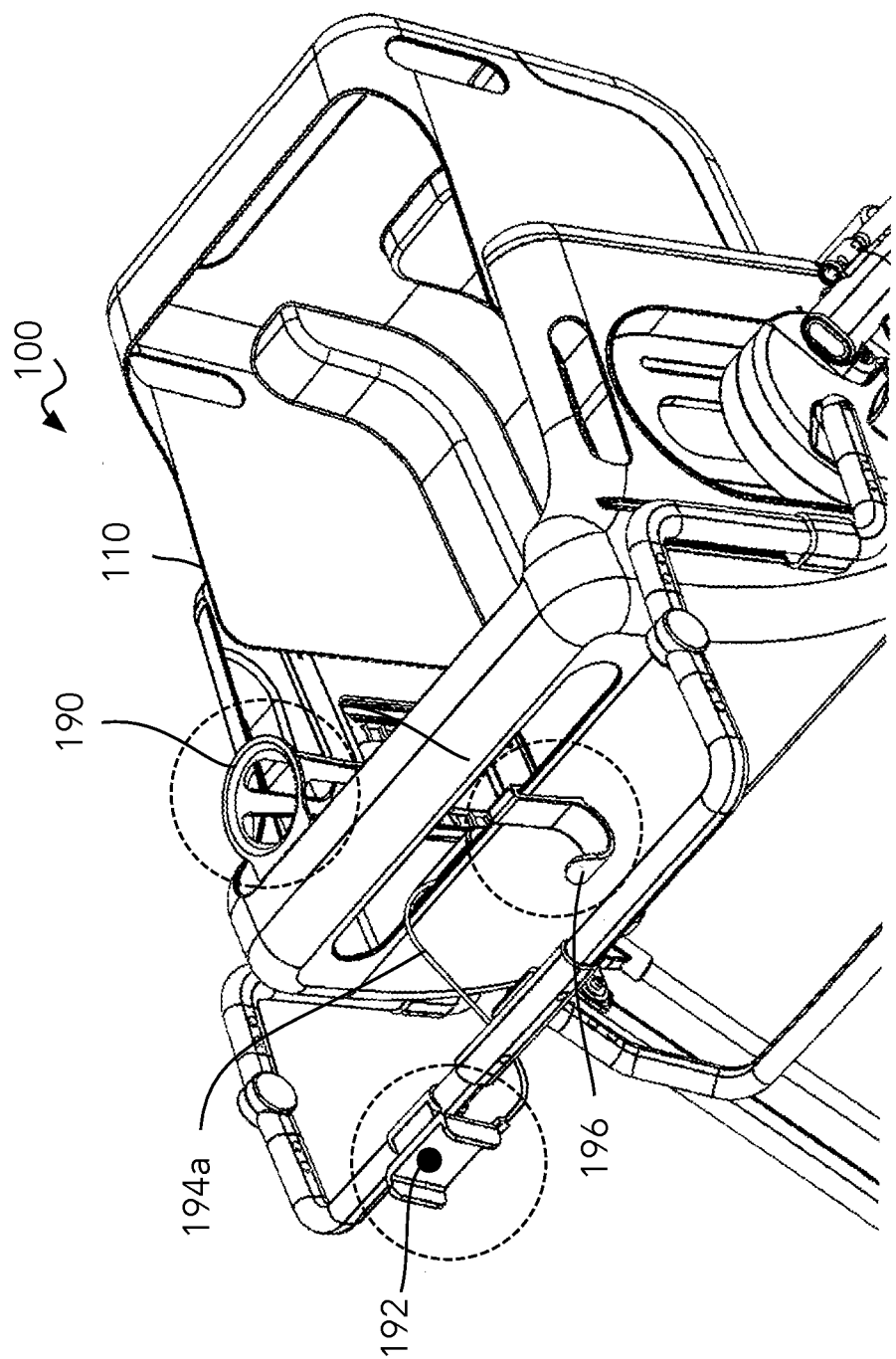
FIGS. 10A-10H provide perspective views of some embodiments of the present disclosure in which the shopping cart includes additional accessories.
Figure 10B:
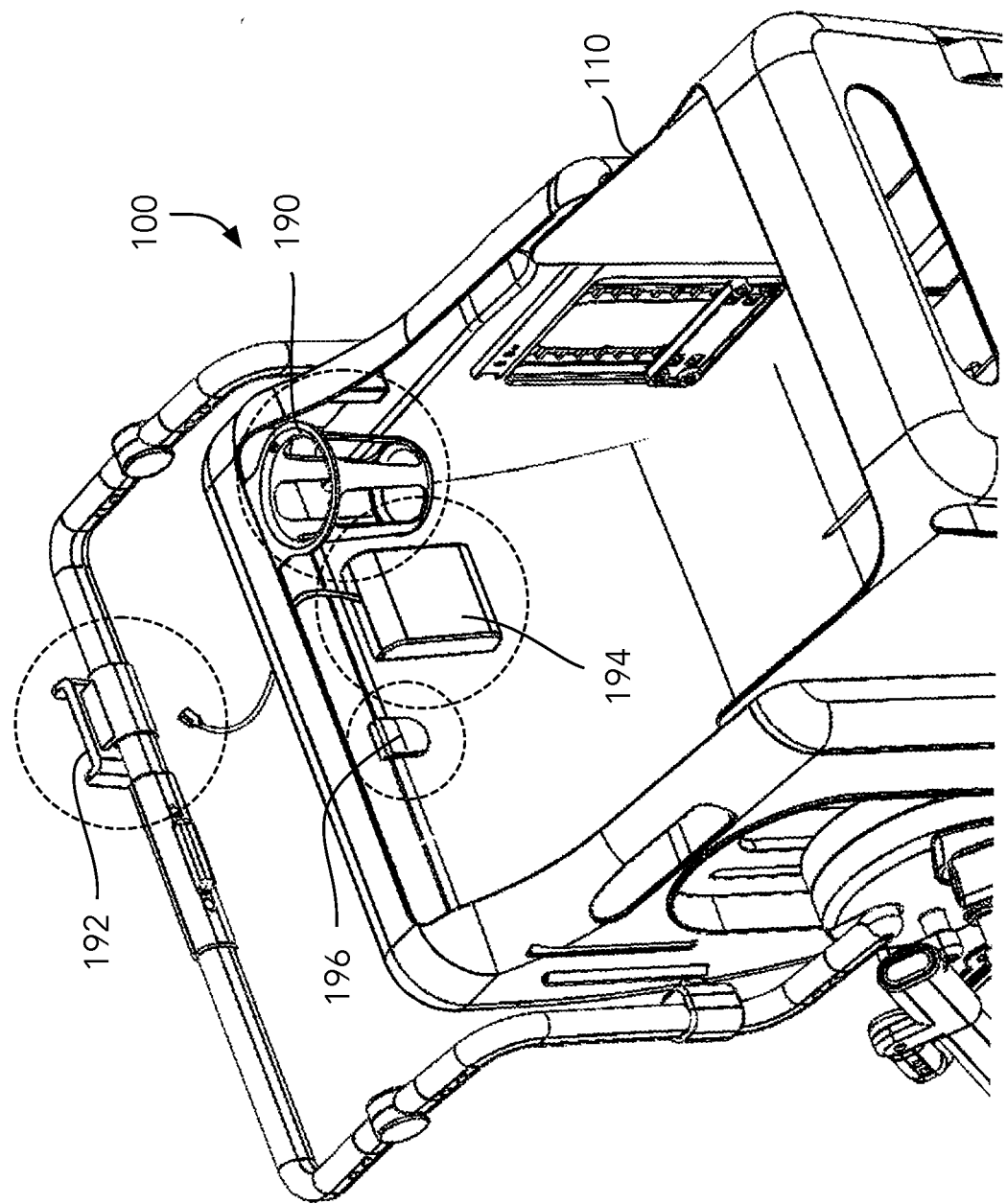

FIGS. 10A-10H provide perspective views of some embodiments of the present disclosure in which the shopping cart 100 may include additional accessories. FIGS. 10A and 10B provide rear and front perspective views of some embodiments of the present disclosure wherein the shopping cart 100 may include a cup holder 190 affixed to the basket 110. Additionally, as also shown in FIGS. 10A and 10B, in some embodiments the shopping cart 100 may include a dock 192 affixed to the handlebar 146. The dock 192 is used for attaching a smart phone, tablet, iPad, cell phone, or the like to the shopping cart 100. In some further embodiments illustrated in FIGS. 10A and 10B, the shopping cart 100 may additionally include a battery pack 194 affixed to the basket 110 and a charging cord 194a extending from the battery pack 194 to the dock 192. In still further embodiments of the present disclosure, the shopping cart 100 may include a purse holder 196 or hook affixed to the basket 110.

Figure 10D:
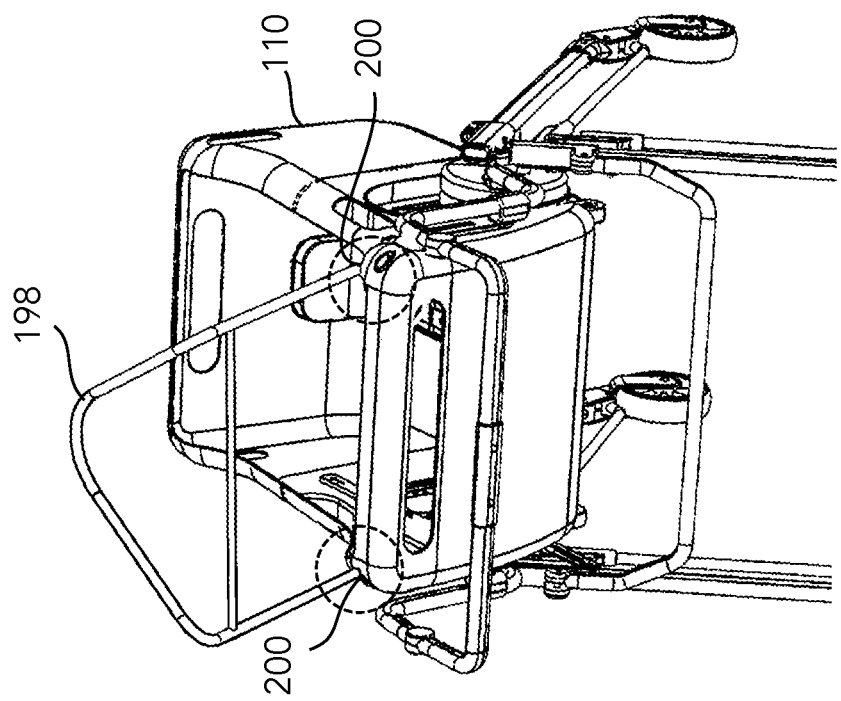
Figure 10C:
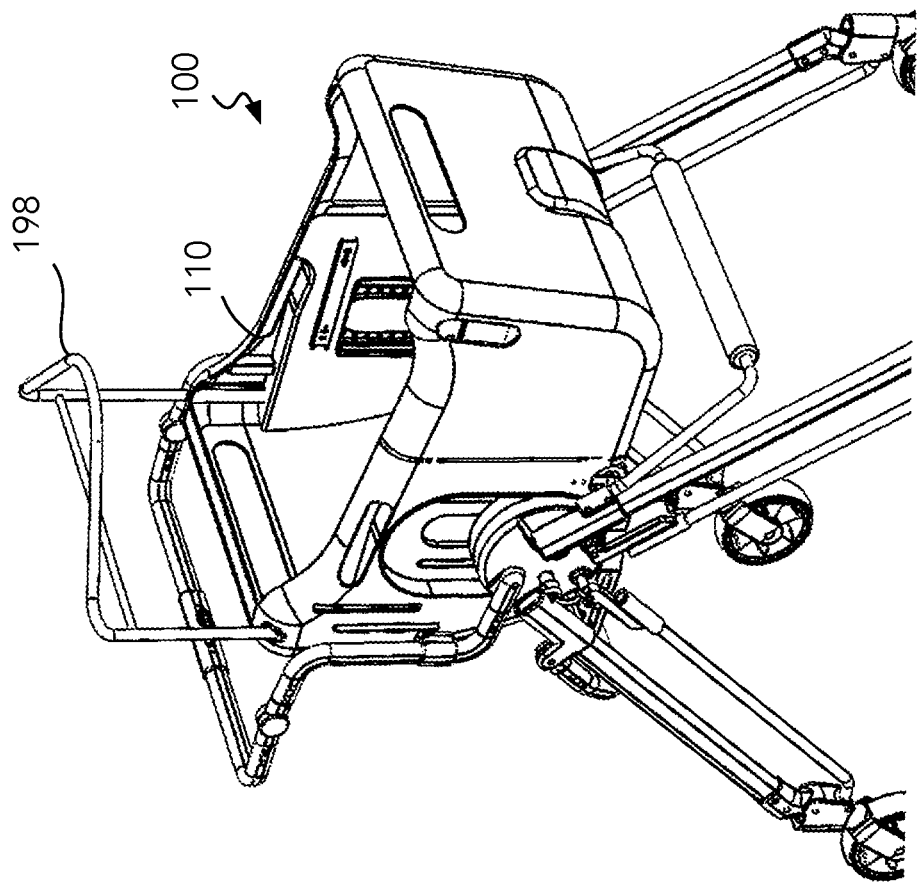
Figure 10F:
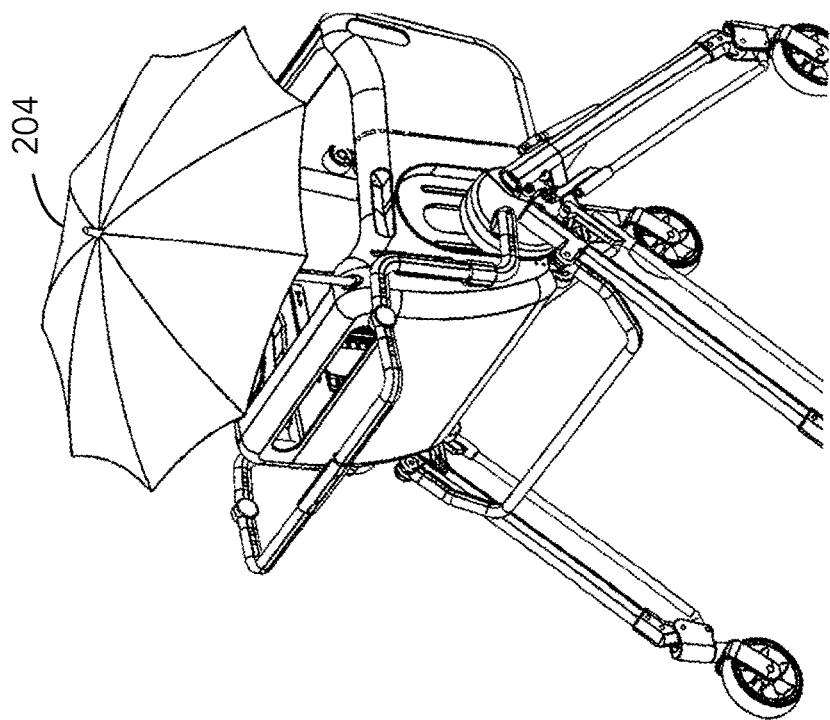
Figure 10E:
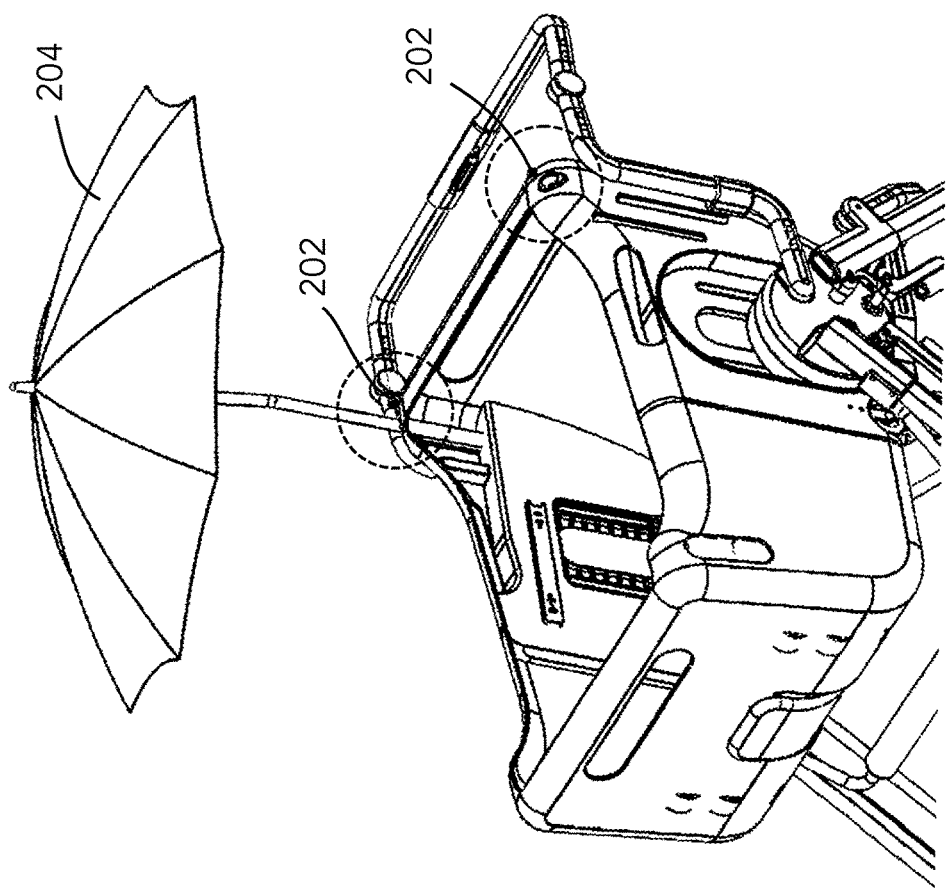

FIGS. 10C and 10D provide perspective views of some embodiments of the present disclosure that may include a clothes rod 198 for transporting clothes. As illustrated, the clothes rod 198 is affixed to the basket 110 by use of mounting holes 200 or other suitable mounting mechanisms. FIGS. 10E and 10F provide perspective views of some embodiments of the present disclosure wherein the shopping cart 100 may include mounting holes 202 for an umbrella 204. In some embodiments the mounting holes 202 can be located on either side of the basket 110.

Figure 10H:
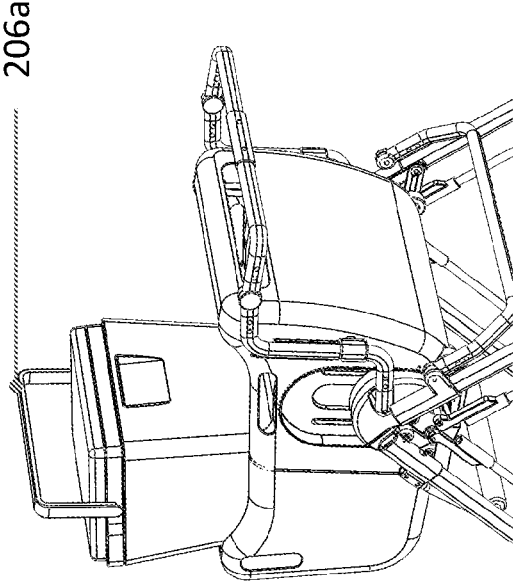
Figure 10G:
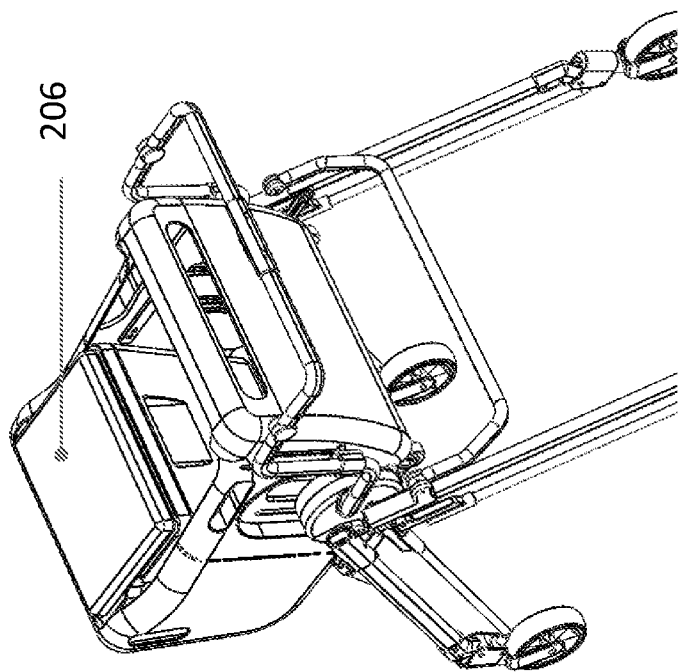

FIGS. 10G and 10H provide perspective views of some embodiments of the present disclosure wherein the shopping cart 100 is used to carry a food or beverage cooler 206. As shown, the cooler 206 may include a handle 206a for easy placement and removal of the cooler 206 in the basket 110 of the shopping cart 100.

It should be understood that the accessories described with reference to FIGS. 10A-10H are exemplary and not intended to be an exhaustive list. Additional accessories may be included with the shopping cart 100 of the present disclosure that remain within the purview of the disclosure.

Figure 11B:
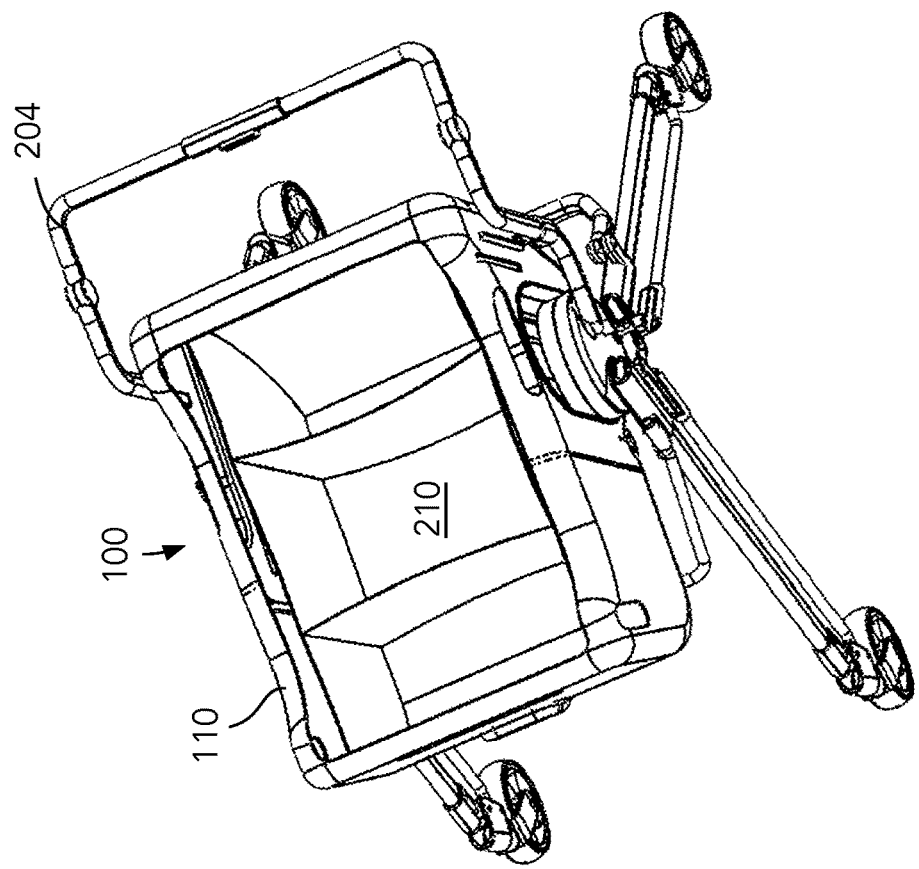
FIGS. 11A-11J provide perspective views of some embodiments of the basket of the shopping cart of the present disclosure.
Figure 11A:
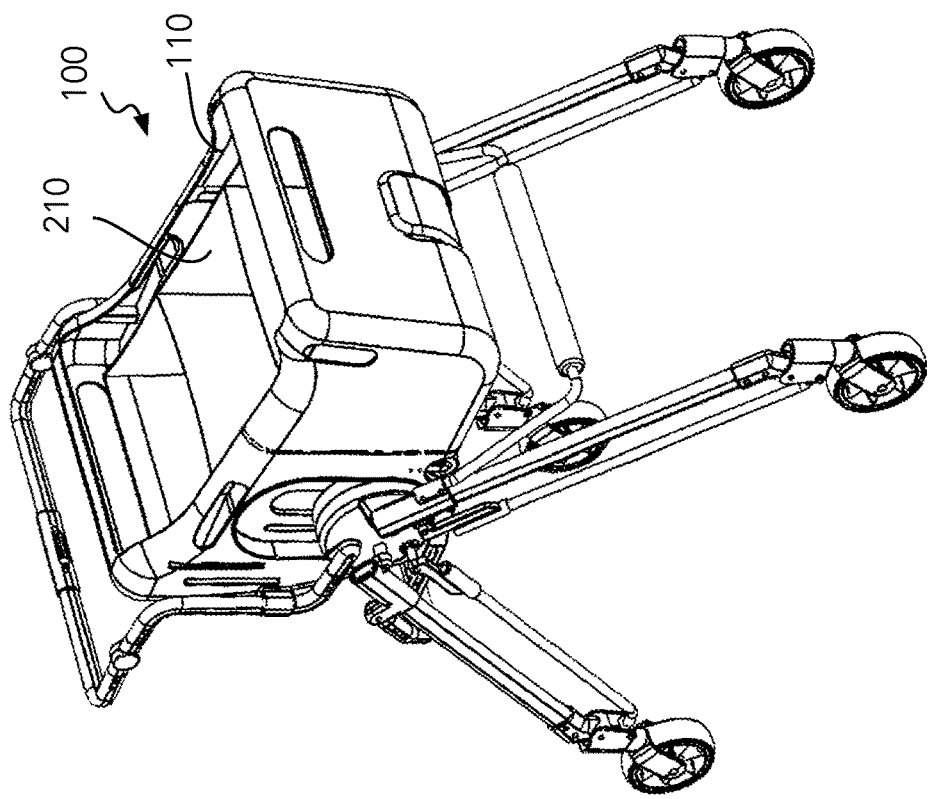
Figure 11D:
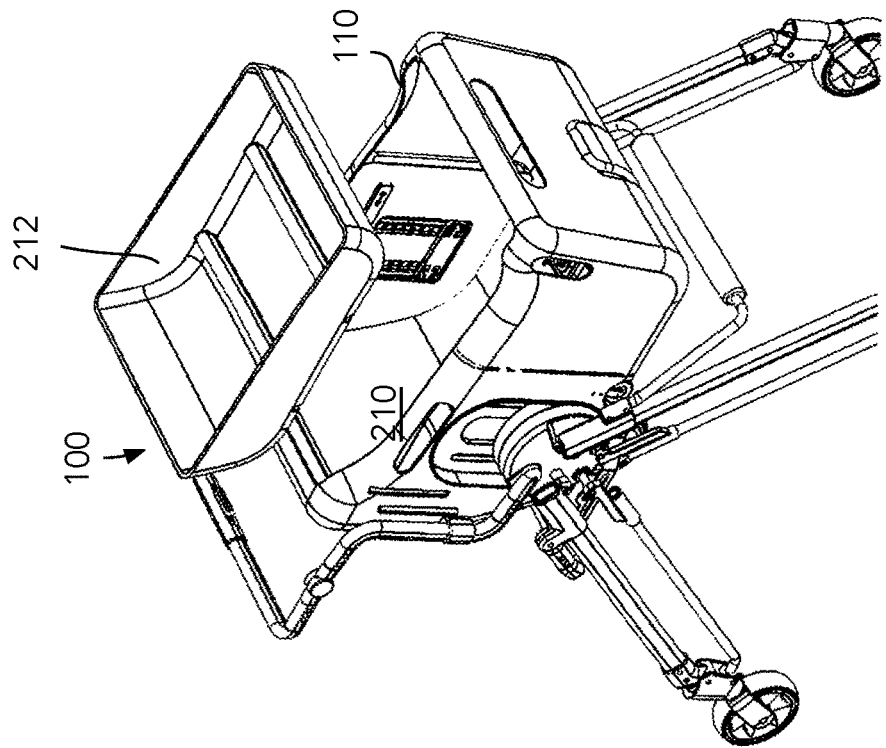
Figure 11C:
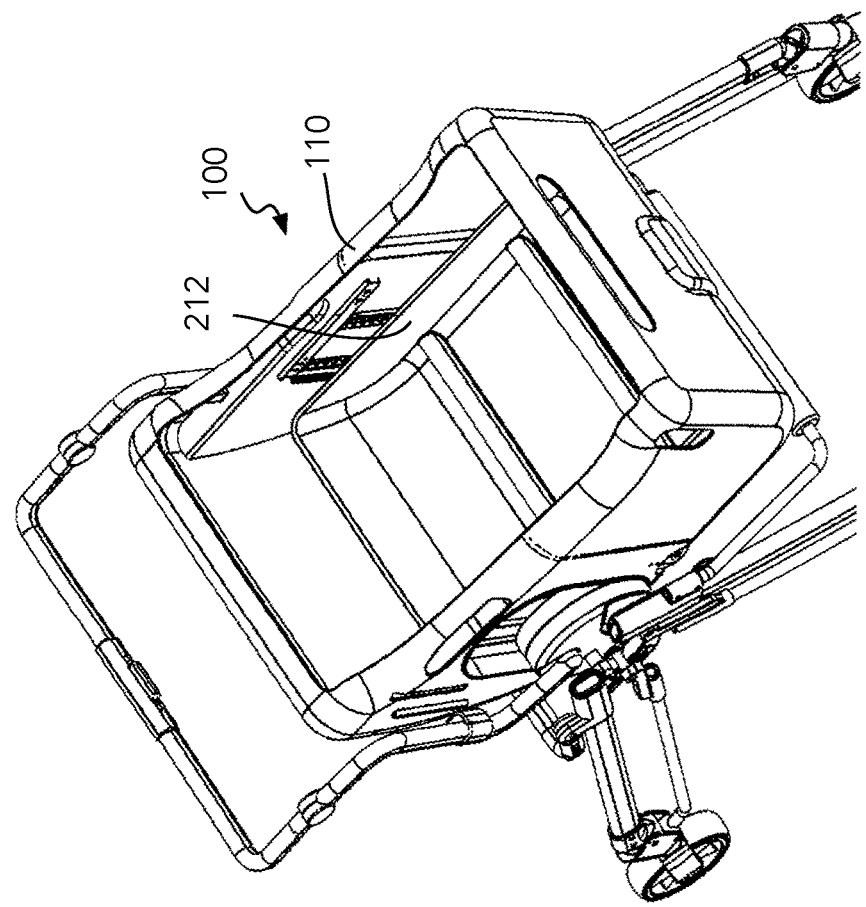

FIGS. 11A-11J provide perspective views of some embodiments of the basket 110 of the shopping cart 100 of the present disclosure. FIGS. 11A and 11B show an embodiment of the basket 110 that may include one or more dividers 210. The dividers 210 illustrated divide the basket 110 into three (3) compartments but it should be understood that the basket 110 may be divided into any number of compartments by the dividers 210. FIGS. 11C and 11D illustrate an embodiment of the basket 110 that may include a removable basket protector 212. The basket protector 212 is shown in its installed position in FIG. 11C and in its removed position in FIG. 11D. The basket protector 212 may be removed to dispose of any waste caught and may be cleaned prior to re-installing.

Figure 11F:
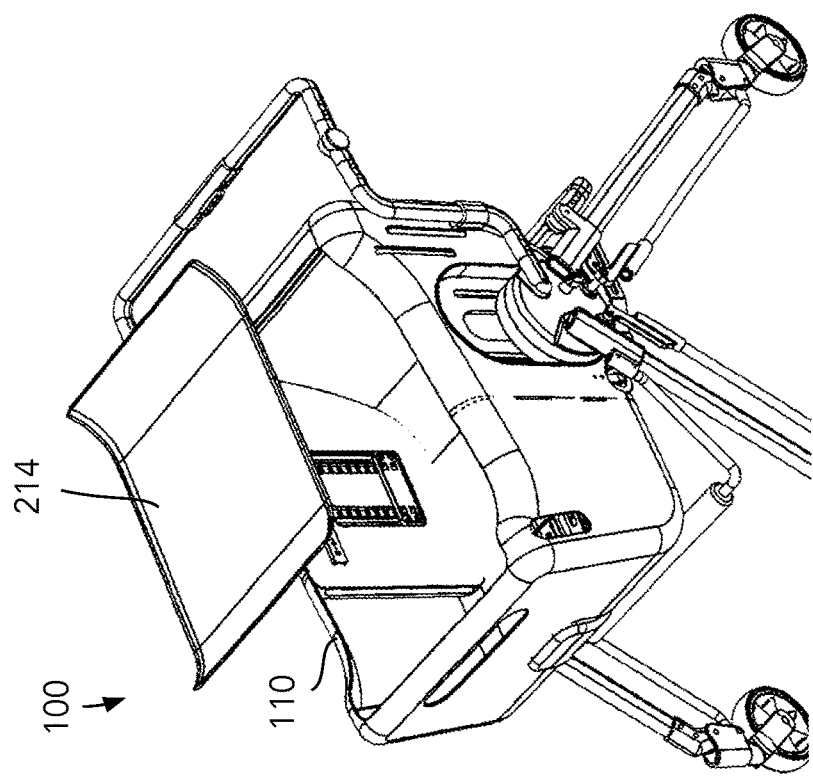
Figure 11E:
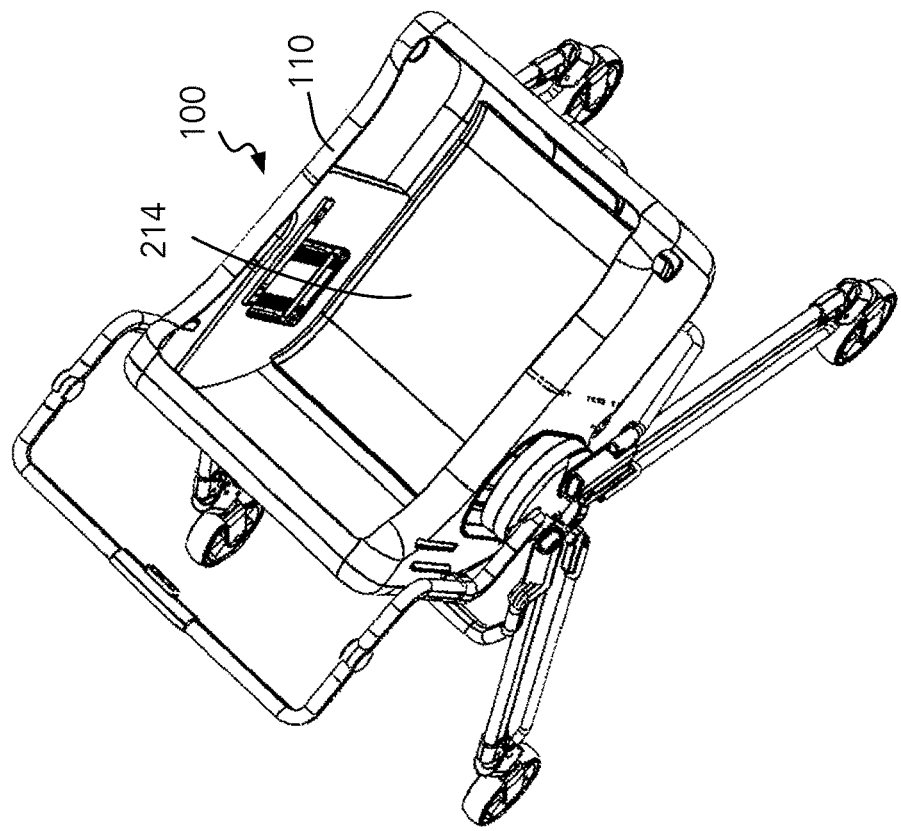
Figure 11H:
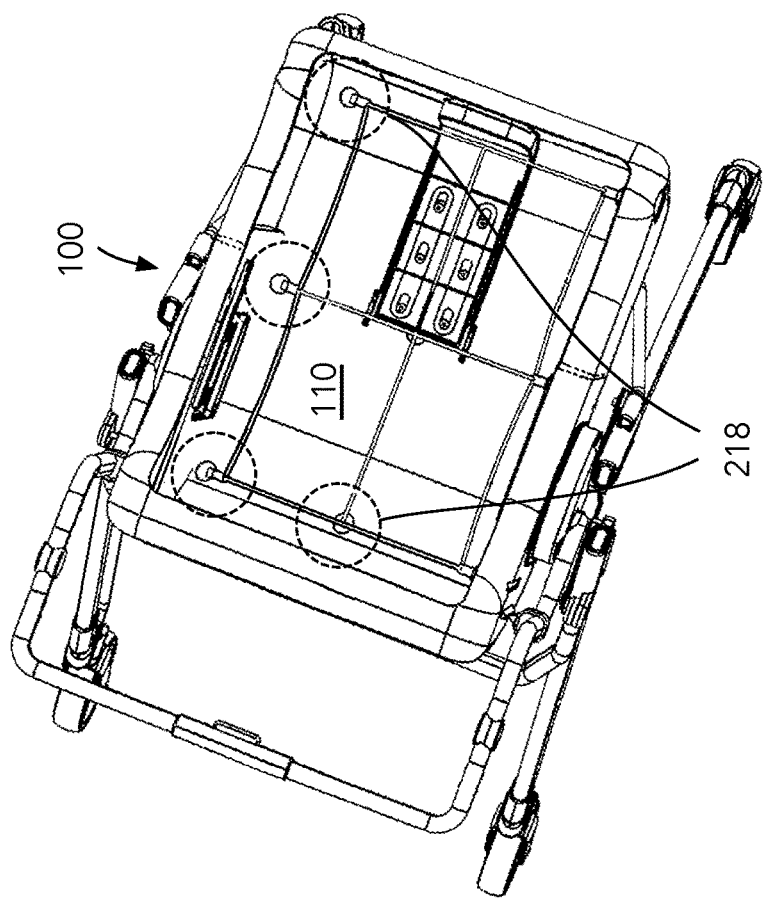

FIGS. 11E and 11F provide perspective views of an embodiment of the basket 110 that may include a floor mat 214 made of rubber or other suitable material to minimize sliding of the goods carried in the basket 110. As shown in FIG. 11F, the floor mat 214 can be removed from the basket 214 as needed for cleaning.

Figure 11G:
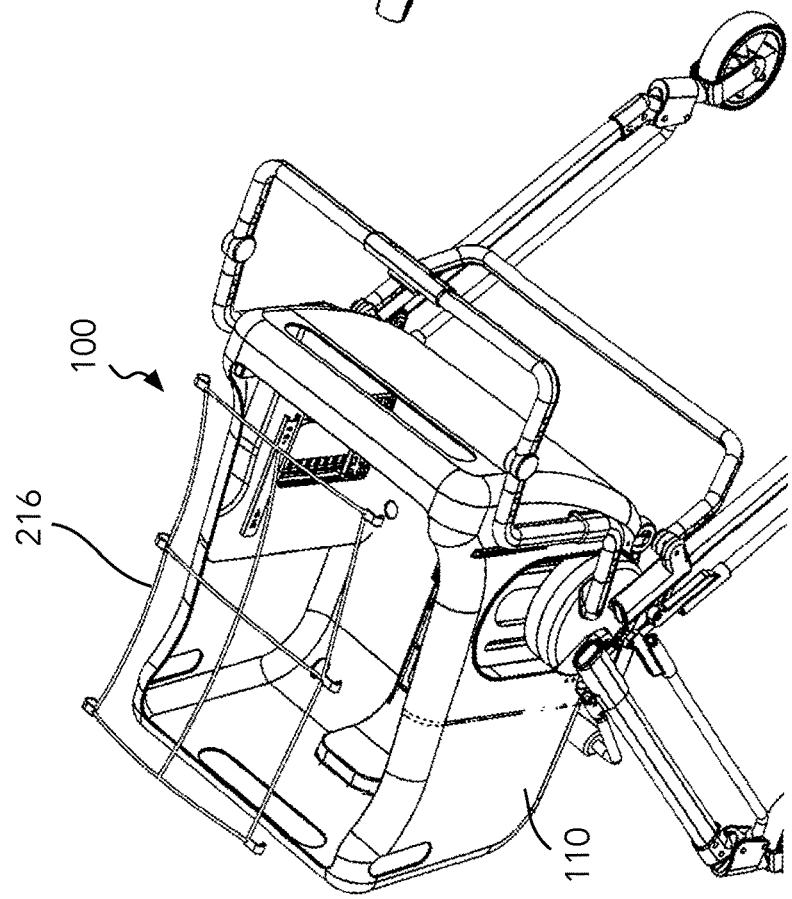
Figure 11J:
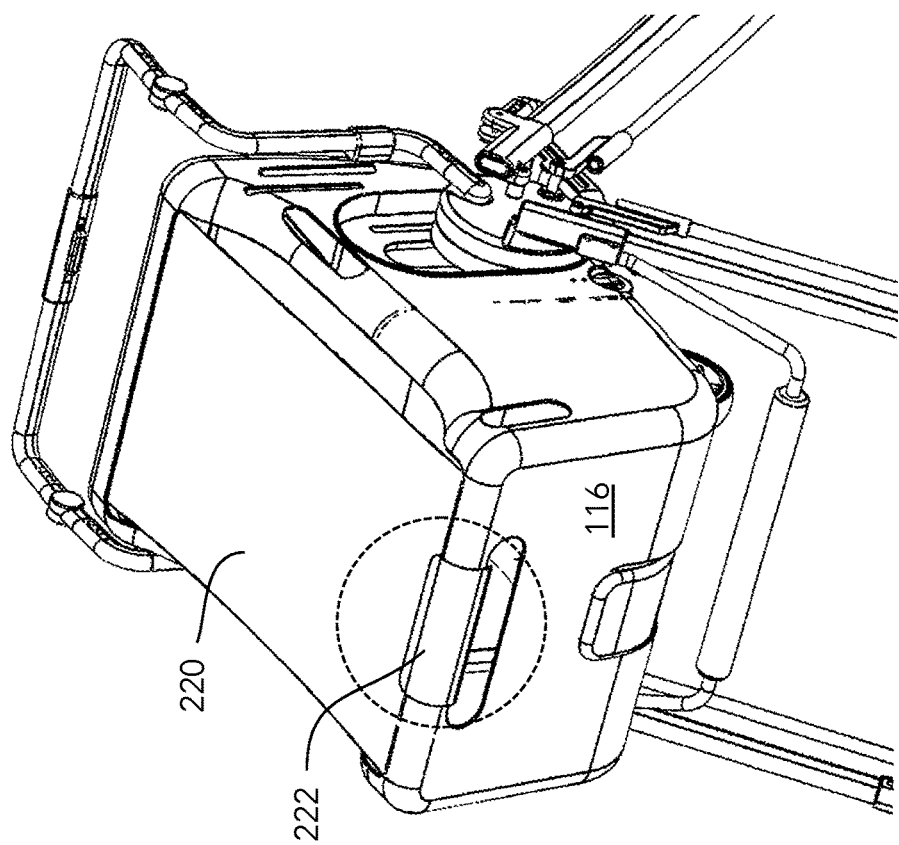
Figure 11I:
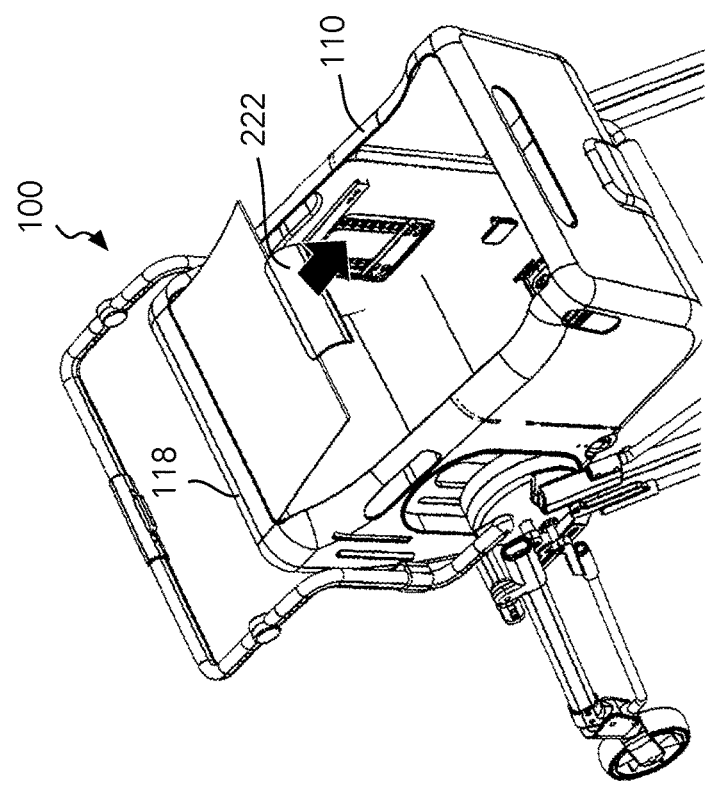

FIGS. 11G and 11E provide perspective views of an embodiment of the basket 110 that may include bungee cords 216 affixed to the basket 110 through a series of attachment holes 218. The bungee cords 216 can be used to secure goods being carried within the basket 110. In some embodiments of the basket 110, and as shown in FIGS. 11I and 11J, the basket 110 may include a retractable cover screen 220. In the embodiment shown, the cover screen 220 is affixed to the rear wall 118 of the basket 110 and extends to the front wall 116 of the basket 110. The cover screen 220 is affixed to the front wall 116 of the basket by a connector 222 such as a clasp.

It should be understood that the embodiments of the basket 110 described with reference to FIGS. 11A-11J are exemplary and not intended to be an exhaustive list. The basket 110 may be adapted to carry a range of goods having a range of sizes and shapes. Additional embodiments of the basket 110 may be included with the shopping cart 100 of the present disclosure that remain within the purview of the disclosure.

Figure 12:
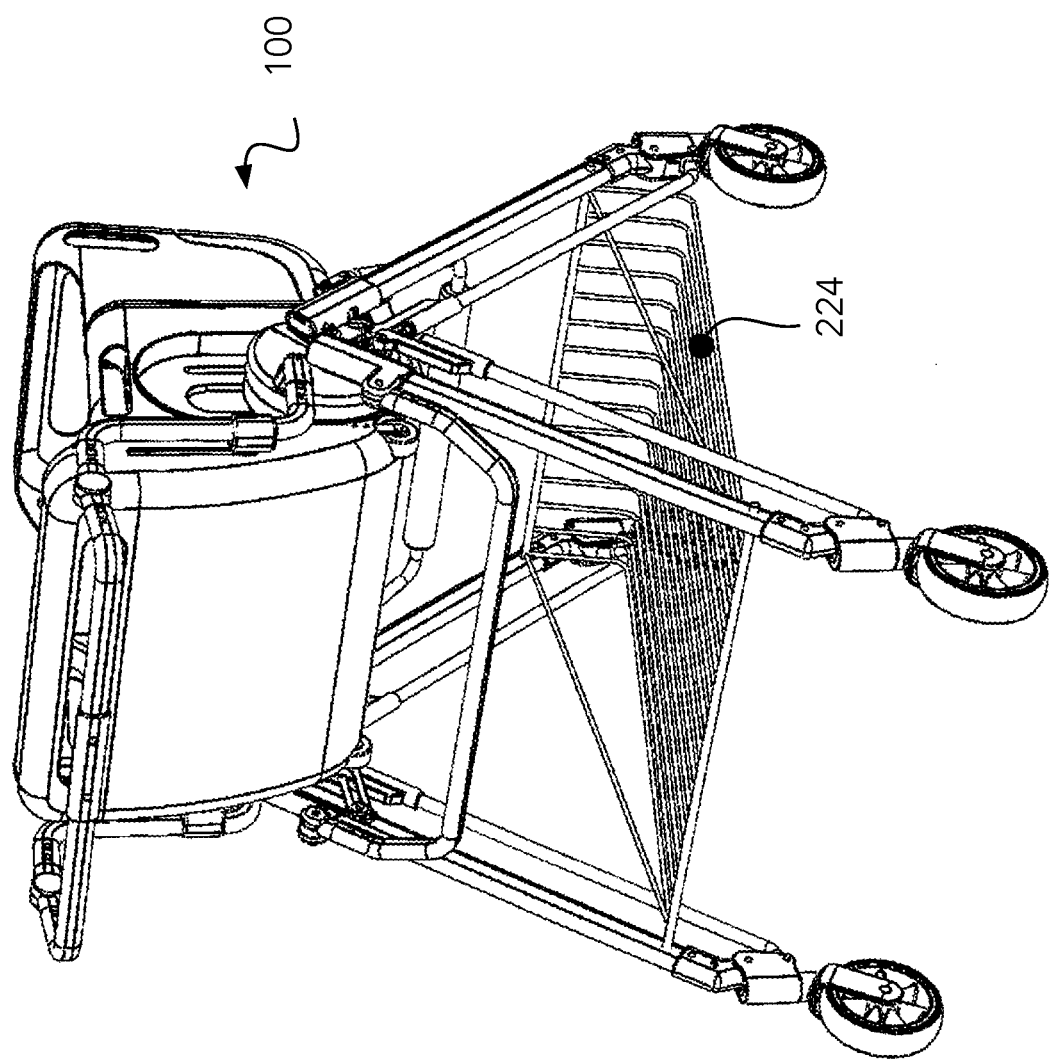
FIG. 12 shows a rear perspective view of an embodiment of the shopping cart of the present disclosure that includes a lower platform.

FIG. 12 shows a rear perspective view of an embodiment of the shopping cart 100 of the present disclosure that includes a lower platform 224. The lower platform 224 may be used to carry additional goods such as bulkier goods.

Reference throughout this specification to "one embodiment," "an embodiment," "some embodiments" or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

What is claimed is:

1. A cart for carrying goods, comprising:
   a basket with chassis connectors and with two chassis channels;
   a chassis with a front frame bumper, the chassis comprising four legs movable from an open position to a closed position the chassis having at least two hubs connected to the chassis connectors in a central portion of the basket, the at least two hubs configured to rotate with respect to the basket wherein each of the four legs is connected to one of the hubs, and wherein the basket is height adjustable through movement of the hubs within the chassis channels, wherein the front frame bumper is rotatably connected to at least one hub of the two hubs, wherein a first front pair of the four legs is attached to the at least two hubs and a second back pair of the four legs are attached to the at least two hubs, and wherein the open position of the first front pair of the four legs extend from the at least two hubs to a front side of the cart and the second back pair of the four legs extend from the at least two hubs to a back side of the cart and the closed position provides for the four legs to be rotated from underneath the basket to the back side of the cart;
   a lifting bar rotatably attached to the chassis, the lifting bar configured to lift the cart when pulled;
   wherein the basket is rotatably affixed to the chassis such that the cart can be placed in a vehicle trunk while the basket maintains a horizontal position.

2. The cart of claim 1, wherein the [car] cart comprises a shopping cart.

3. The cart of claim 1, wherein the chassis further comprises a handlebar that is used to move the legs from their open position to their closed position.

4. The cart of claim 1, wherein the basket may be affixed to the chassis at adjustable heights.

* * * * *